US009482384B2

(12) United States Patent
Stuble

(10) Patent No.: US 9,482,384 B2
(45) Date of Patent: Nov. 1, 2016

(54) SUPPORT, SUSPENSION, DRIVE, AND POSITION CONTROL SYSTEM FOR ROTARY EQUIPMENT

(71) Applicant: Design20First, LLC, Cora, WY (US)

(72) Inventor: William E. Stuble, Cora, WY (US)

(73) Assignee: DESIGN20FIRST, LLC, Cora, WY (US)

(*) Notice: Subject to any disclaimer, the term of this patent is extended or adjusted under 35 U.S.C. 154(b) by 247 days.

(21) Appl. No.: 14/322,761

(22) Filed: Jul. 2, 2014

(65) Prior Publication Data
US 2016/0003408 A1 Jan. 7, 2016

(51) Int. Cl.
*F16M 11/04* (2006.01)
*F16M 11/42* (2006.01)

(52) U.S. Cl.
CPC .............. *F16M 11/42* (2013.01); *F16M 11/04* (2013.01)

(58) Field of Classification Search
CPC .......... F27B 2007/2253; F16M 11/04; F16M 11/42
USPC ................. 476/67; 34/601; 241/178; 366/61
See application file for complete search history.

(56) References Cited

U.S. PATENT DOCUMENTS

| 1,184,174 | A | | 5/1916 | Gilbert |
| 1,802,917 | A | | 4/1931 | Kennedy |
| 2,269,700 | A | | 1/1942 | Treshow |
| 2,551,774 | A | * | 5/1951 | Traylor, Jr. ............... F27B 7/22 241/178 |
| 2,853,246 | A | * | 9/1958 | Schoonover .......... B02C 17/181 241/178 |
| 3,015,528 | A | | 1/1962 | Clark et al. |
| 3,033,057 | A | * | 5/1962 | Gray ................... E01C 19/1031 366/144 |
| 3,371,547 | A | * | 3/1968 | Eckert ..................... B02C 17/24 476/67 |
| 3,375,944 | A | | 4/1968 | Bexten |
| 3,436,062 | A | | 4/1969 | Raevsky |
| 3,468,522 | A | | 9/1969 | Bovagne |
| 3,517,915 | A | | 6/1970 | Bovagne et al. |
| 3,669,433 | A | | 6/1972 | Hurst |
| 3,708,001 | A | * | 1/1973 | Koskinen ................ B27L 1/025 144/208.9 |
| 3,729,181 | A | | 4/1973 | Itoh et al. |
| 3,836,103 | A | | 9/1974 | Retali et al. |
| 3,966,395 | A | | 6/1976 | Schneider et al. |

(Continued)

FOREIGN PATENT DOCUMENTS

| EP | 1691479 | * | 8/2006 |
| GB | 887791 | | 1/1962 |
| JP | 2011-33240 | * | 2/2011 |

OTHER PUBLICATIONS

FLSmidth, Rotary Kilns for the Minerals Industries, (brochure), revised Sep. 6, 2011.

(Continued)

*Primary Examiner* — William C Joyce
(74) *Attorney, Agent, or Firm* — Cochran Freund & Young LLC; James M. Weatherly

(57) ABSTRACT

A support, suspension, drive, traction and position control system comprised of mechanical, electrical, and hydraulic components integrated with computer controls for the rotation and maintenance of the operation of various types of rotary equipment including kilns, calciners, dryers, grinding mills, ball mills, and dissolvers. Further provided are methods for the use of the support, suspension, drive, traction and position control system and hydraulic components disclosed herein integrated with computer controls to rotate and maintain the operation of various types of rotary equipment.

32 Claims, 14 Drawing Sheets

(56) References Cited

U.S. PATENT DOCUMENTS

| | | | |
|---|---|---|---|
| 4,108,410 | A | 8/1978 | Chielens et al. |
| 4,118,180 | A | 10/1978 | Bliemeister |
| 4,171,949 | A * | 10/1979 | Endersen ............... F16C 13/04 432/103 |
| 4,225,197 | A | 9/1980 | Mantegani |
| 4,274,825 | A | 6/1981 | North |
| 4,278,425 | A | 7/1981 | Hirbod |
| 4,337,929 | A | 7/1982 | Evans |
| 4,403,952 | A | 9/1983 | Birch et al. |
| 4,500,285 | A | 2/1985 | Klotmann |
| 4,500,287 | A | 2/1985 | Carraroli |
| 4,511,266 | A | 4/1985 | Klotmann et al. |
| 4,776,788 | A * | 10/1988 | Przewalski ............... F23G 5/20 34/108 |
| 5,000,680 | A | 3/1991 | Jenness |
| 5,044,786 | A | 9/1991 | Jacob et al. |
| 5,146,795 | A | 9/1992 | Gebhart |
| 5,217,374 | A | 6/1993 | Birks |
| 5,343,970 | A | 9/1994 | Severinsky |
| 6,387,009 | B1 | 5/2002 | Haka |
| 7,472,877 | B2 | 1/2009 | Hawkins et al. |
| 2008/0210538 | A1 | 9/2008 | Clark |
| 2011/0065058 | A1 | 3/2011 | Kumagai et al. |

OTHER PUBLICATIONS

PCT Written Opinion and Search Report, PCT/US2015/032946, dated Aug. 26, 2015.

* cited by examiner

Close-up views of the split-rail coupled to the rotating unit 900

SUPPORT, SUSPENSION, DRIVE, AND POSITION CONTROL SYSTEM FOR ROTARY EQUIPMENT

BACKGROUND

The mechanical drive and support system used by various types of rotary equipment including kilns, calciners, dryers, grinding mills, ball mills, and dissolvers has not changed significantly in practice since the original systems were developed in the $19^{th}$ century. Traditionally, rotary equipment has been comprised of heavy, expensive and long delivery time one-piece tyres (or riding rings), supporting trunnions (or rollers), and pinion and bull (girth) gear drive systems. The tyres consist of a solid, continuous smooth steel casting circumventing and operably coupled to the heavy, reinforced thick section of the shell of the equipment. Each tyre is placed and rotates on a pair of rollers, rigidly mounted on a solid foundation, which support the rotary equipment and allow it to rotate smoothly but which require rigorous alignment and frequent maintenance attention.

Traditionally, rotary equipment is turned by a pinion drive gear meshing with a girth gear surrounding the shell of the kiln or rotary equipment. The pinion drive gear is often connected through a gearbox to an electric motor. The drive system likewise is rigidly mounted on a solid foundation and requires rigorous alignment with the girth gear and frequent maintenance attention.

The exigencies of the mechanics of rotary equipment, including rigidity, large size and weight, and exactness of alignment tolerances of the tyres, trunnions, and drive gears, have necessitated the rotary equipment run at relatively low and constant speeds, thus restricting opportunities for improvement in rotary equipment process flexibility, efficiency, quality control, and capacity. The same exigencies have been limiting and governing factors preventing change of the slope of the rotary equipment, which also could improve rotary equipment process flexibility, efficiency, quality control, and capacity in many circumstances.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools, and methods, which are meant to be exemplary and illustrative, not limiting in scope.

An embodiment of the present invention may comprise a support, suspension, drive, traction and position control system for the operation of rotary equipment comprising: a rotary equipment, two or more split rail tyres, wherein the two or more split rail tyres encircle the rotating equipment; one or more sets of oppositely disposed roller units, wherein each roller unit comprises two wheels; a drive axle assembly, wherein the two wheels are operably coupled to the drive axle assembly; a roller drive unit operably coupled to the drive axle assembly, wherein each one or more roller units is in contact with a split rail tyre of the one or more split rail tyres; a flat plate support system; a hydraulic suspension and support system, wherein said hydraulic suspension and support system is operably coupled to said roller drive unit of said roller unit; one or more bogie support structures, wherein the bogie support structures are operably coupled to the hydraulic suspension and support system by means of the flat plate support; a truss, wherein the truss supports the one or more bogie support structures; a foundation, wherein the foundation supports or replaces the truss; and one or more position control modules operably coupled to the roller unit.

An embodiment of the present invention may comprise a method for the operation of rotating equipment, wherein the method comprises providing a mechanical drive and support system for turning rotary equipment wherein the mechanical drive and support system comprises: coupling one or more split rail tyres to a rotary equipment, wherein the one or more split rail types encircle the rotating equipment; placing the rotary equipment on one or more oppositely disposed roller units, wherein the roller units comprise two wheels; a drive axle assembly, wherein the two wheels are operably coupled to the drive axle assembly; a roller drive unit operably coupled to the drive axle assembly, wherein the roller drive unit comprises a driven gear, a pinion drive gear, a gear box, and a motor; providing a flat plate support system; providing a hydraulic suspension and support system, wherein the hydraulic suspension and support system is operably coupled to the roller drive unit of the one or more roller units and wherein the hydraulic suspension and support system adjusts the position of the one or more roller units to provide vertical position control, horizontal alignment control, and drive wheel traction control of the rotating equipment; providing one or more bogie support structures wherein the bogie support structure supports the hydraulic suspension and support system by means of the flat plate support system; providing a truss or foundation, wherein the truss or foundation supports the bogie support structure; providing a foundation, wherein the foundation supports the truss; providing one or more position control modules operably coupled to said rotating equipment; providing a traction measurement system in communication with said one or more position control modules; monitoring the speed, vertical position and horizontal position of said rotating equipment in relation to said one or more roller unit; and adjusting the speed, vertical position and horizontal position of the rotary unit in relation to the one or more roller unit.

In addition to the embodiments described above, further aspects and embodiments will become apparent by reference to the drawings and by study of the following descriptions, any one or all of which are within the invention. The summary above is a list of example implementations, not a limiting statement of the scope of the invention.

BRIEF DESCRIPTION OF THE FIGURES

The accompanying drawings, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Figure 1:
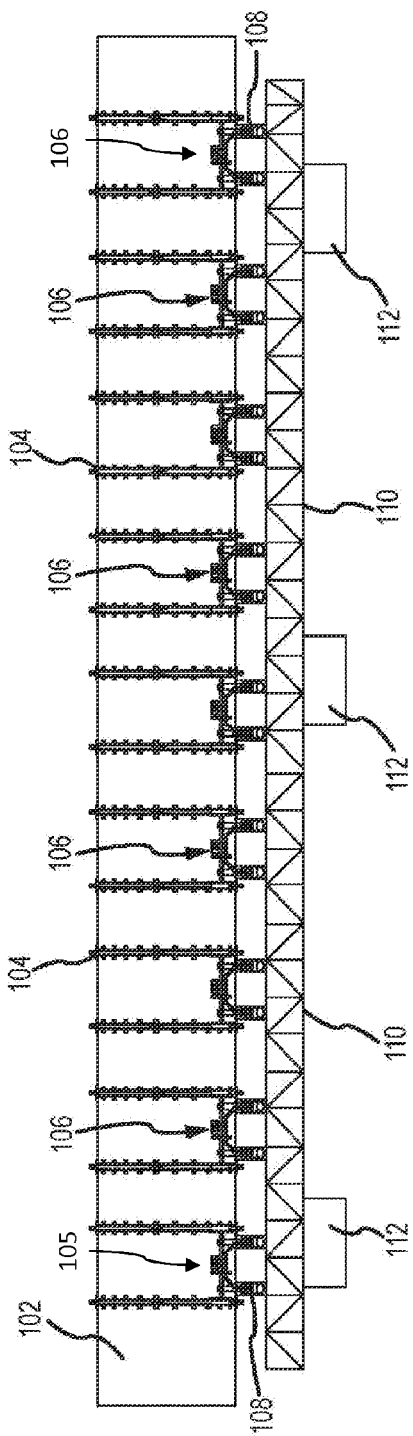
FIG. 1 is a diagram showing an overall side view of the rotary equipment support, suspension, drive and position control system of the present disclosure.

One or more embodiments described herein provides a support, suspension, drive and position control system for turning and operation of rotating equipment, such as kilns, calciners, dryers, grinding mills, ball mills, and dissolvers, where the equipment, with split rails operably coupled or mounted to the rotating equipment, is placed on one or more roller units comprising one or more drive wheels, drive axles, drive power and gearbox units, flat plate supports, and hydraulic suspension supports, which in turn are operably coupled to one or more bogie support structures. As the wheels of the roller units turn or rotate, the adhesion, friction or traction between the wheels and the split rails created by the friction between the two components, allows the wheels to maintain traction with the split rails and allowing the rotating equipment to rotate in a controlled manner. (Please note that use of the words "adhesion" or "adherence", between the wheels and split rails, refers to friction, the rolling or kinetic type, and not actual holding fast or sticking by means of firm attachment.)

The weight distribution provided by the multiple roller units, supported by multiple bogies and continuous longitudinal truss, allows diminishment of strength, weight and structural robustness of the rotary equipment, which is traditionally supported by only two or three pairs of massive trunnions or rollers with a long span of cylindrical rotary equipment in between. This in turn allows diminishment of the strength, weight and structural robustness of the support, suspension, and drive system components as disclosed herein. As will be discussed in further detail, the overall system of the present disclosure is lighter, less bulky, and less expensive to manufacture, install, operate, and maintain than conventional drive and support systems for rotary equipment.

An additional embodiment of the present disclosure provides a hydraulic suspension control system, which may be active, for use with a mechanical drive and support system for turning rotary equipment, where the hydraulic pressure control system adjusts automatically, or by hand, the location of the wheels of the roller drive unit in relation to the bogie support structure and to the split rails coupled to rotating or rotary equipment. The hydraulic suspension control system allows the wheels operably coupled to the axle assembly to move towards the equipment axis at an example tangential angle, allowing the system to actively adjust and maintain continuous contact between the wheels supporting and driving the system and the split rails. This adjustment of the contact between the wheels operably coupled to the axle assembly and the split rails allows the system to maximize the adhesion, traction and static friction between the wheels and the split rails, thus allowing the drive system to reduce slippage between the wheels and the split rails and eliminate the need for the traditional large pinion drive gear and girth gear drive system.

An additional embodiment of the present disclosure may include the ability of the hydraulic suspension control system to adjust the skew or directional alignment of the wheels of the axle assembly in relation to the split rails with respect to the axis of the rotary equipment, thus affecting the angle of the driving forces of the drive wheels in relation to the split rails and thus affecting a change in the horizontal (axial) position (alignment) of the rotary equipment.

An additional embodiment of the present disclosure may include a hydraulic suspension control system in communication with speed, horizontal, vertical and power sensors, which monitor the speed, power, traction, as well as horizontal and vertical alignment of the rotary equipment in relation to the wheels of the axle assembly. The speed, horizontal, vertical and power sensors allow the system of the present disclosure to monitor and cope with eccentricities in the shape and cylindrical straightness of the rotary equipment as well as changes in the horizontal and vertical axis positions of the rotary equipment caused by changes in process loading, thermal expansion, or foundation and structural support and hence additionally allowing each axle assembly to move to maintain constant contact, friction or traction to the split rails and also to skew the wheels of the axle assembly as necessary to effect horizontal alignment and mechanical efficiency.

Further, speed and power sensors in communication with the hydraulic suspension and support system and the drive system of the present disclosure may be provided, that monitor the speed and work load of each drive unit with respect to the rotation of the rotary equipment. The speed and power sensors provide data related to the speed of rotation to a motor speed and traction controller. Based on the data from the speed and power sensors, a motor speed and traction controller is able to adjust the speed of the drive wheels, and provide diagnostic information about the mechanical integrity and worthiness of the system that drives the rotary equipment.

The system of the present disclosure removes the need for a large pinion and girth gear drive mechanism for either the high load inertia starting or for continuing loaded rotation of rotary equipment due to the continuously computer controlled variable speed, power, traction and hydraulic suspension and support system. Similarly, in an embodiment, the continuously computer controlled hydraulic skewing adjustment of the drive wheel shafts, supplemented by oppositely disposed rimmed drive wheels and one or more anchoring drive units, eliminates the need for traditional thrust rollers or buttons that push laterally on one or more of the tyres as well as reducing mechanical wear and energy consumption.

The rotary equipment drive system and methods of using the drive system described herein assimilates common and proven technologies associated with railroad technology into a drive system for rotary equipment, such as kilns. The drive system of the present disclosure does not require conventional heavy, expensive and long delivery time one-piece tyres, pinion and bull gear drive systems, as well as their rigorous and ponderous alignment requirements, providing significant initial cost and total life cost reductions to the operators of various forms of rotary equipment. The drive system described herein provides compactness, interchangeability, modularity, reduced downtime, ease of parts replacement, continuous and more precision position control with less energy consumption and less maintenance attention.

The support, suspension, drive and position control system and methods described herein provide higher and variable operating speeds, and variable equipment slope, in comparison with existing technology.

FIG. 1 provides a diagram showing an example overview of an embodiment of the rotary or rotating equipment drive system of the present disclosure 100. As shown in FIG. 1, a cylindrical, rotary unit or rotating equipment 102 is provided, such as but not limited to a kiln, calciner, dryer, mixer or grinding mill. The rotating equipment 102 is a cylindrical, hollow vessel, inclined slightly to the horizontal, which is rotated slowly about its horizontal axis. Material is processed within the shell of the rotating equipment 102, where the material is fed into one end of the rotating equipment 102. As the equipment 102 rotates, material gradually moves by gravity and possibly with assistance from other forces such as gas convection down towards the lower end.

One or more split rails 104 or tyres, are operably coupled to the rotating equipment 102. The split rails 104 are rails, which are split into one or two pieces and are pointed to allow for bumpless transition from one to the other as the rails move over the drive rollers. The split rails also allow for expansion, mainly caused by temperature differences between the rails and the equipment and different thermal expansion coefficients when different materials are used, as well as to facilitate ease of replacement of the rail 104. In the example drive system 100 shown in FIG. 1, nine (9) sets of two split rails 104 are illustrated, but any number of split rails 104 may be used. Therefore, while this descriptive example has nine sets, or eighteen conjoined split rails 104, it should be understood that this description is applicable to any such system with other numbers of split rails 104, as will be understood by one skilled in the art, once they understand the principles of this invention. The use of the split rails 104 of the drive system disclosed herein replaces the large one-piece tyres used with conventional rotary equipment systems. By using split rails 104, the size, weight and thicker reinforced shell sections under the tyres of conventional rotary equipment 102 can be reduced because the use of multiple split rails 104 distributes the weight of the rotating equipment 102 more evenly than the weight distribution of the conventional tyre systems, eliminating the need for heavier (thicker) rotary equipment shells. This in turn reduces the size and strength of the corresponding rotary equipment drive and foundation systems.

Figure 3:
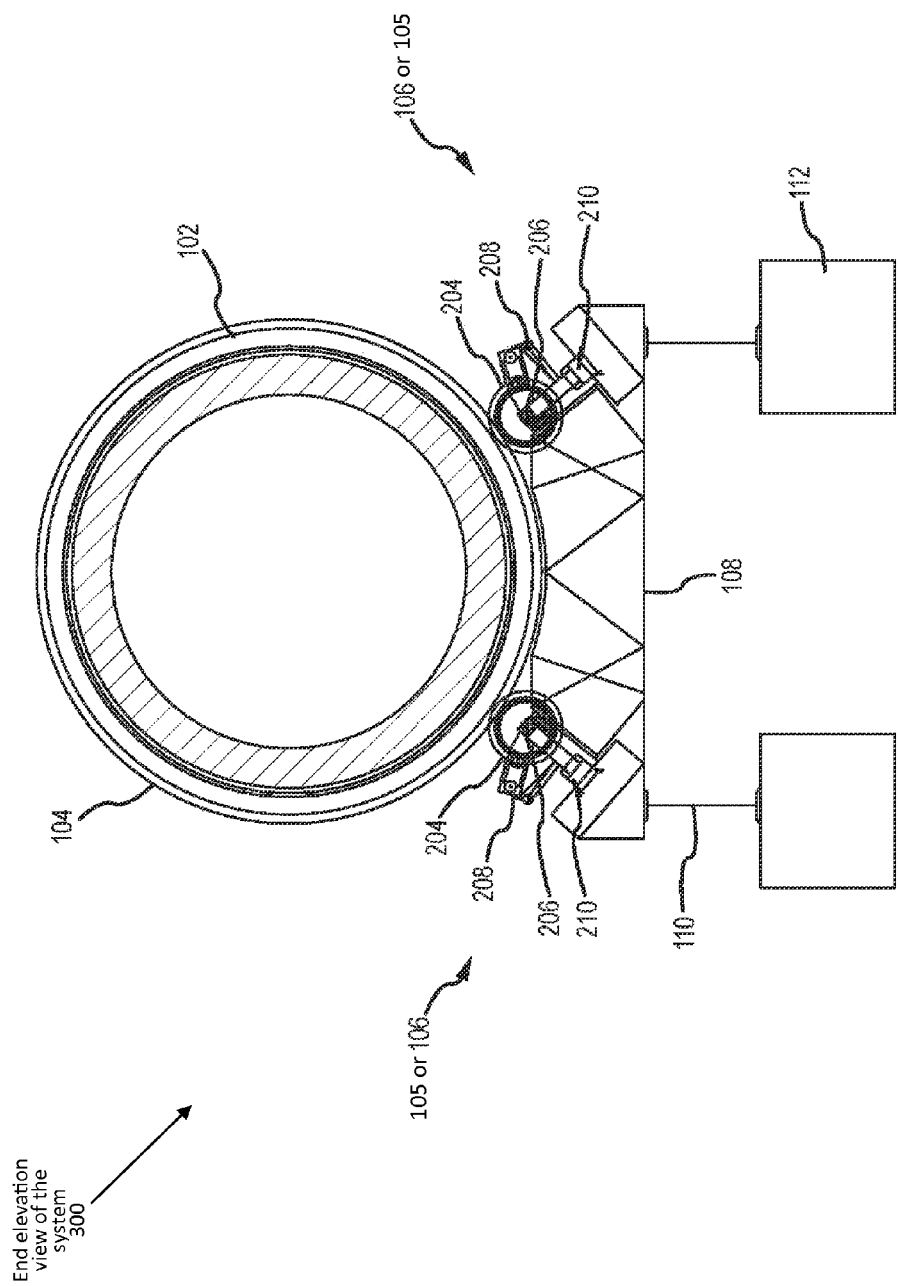
FIG. 3 is a diagram of an end elevation view of the system of the present disclosure.
Figure 4:
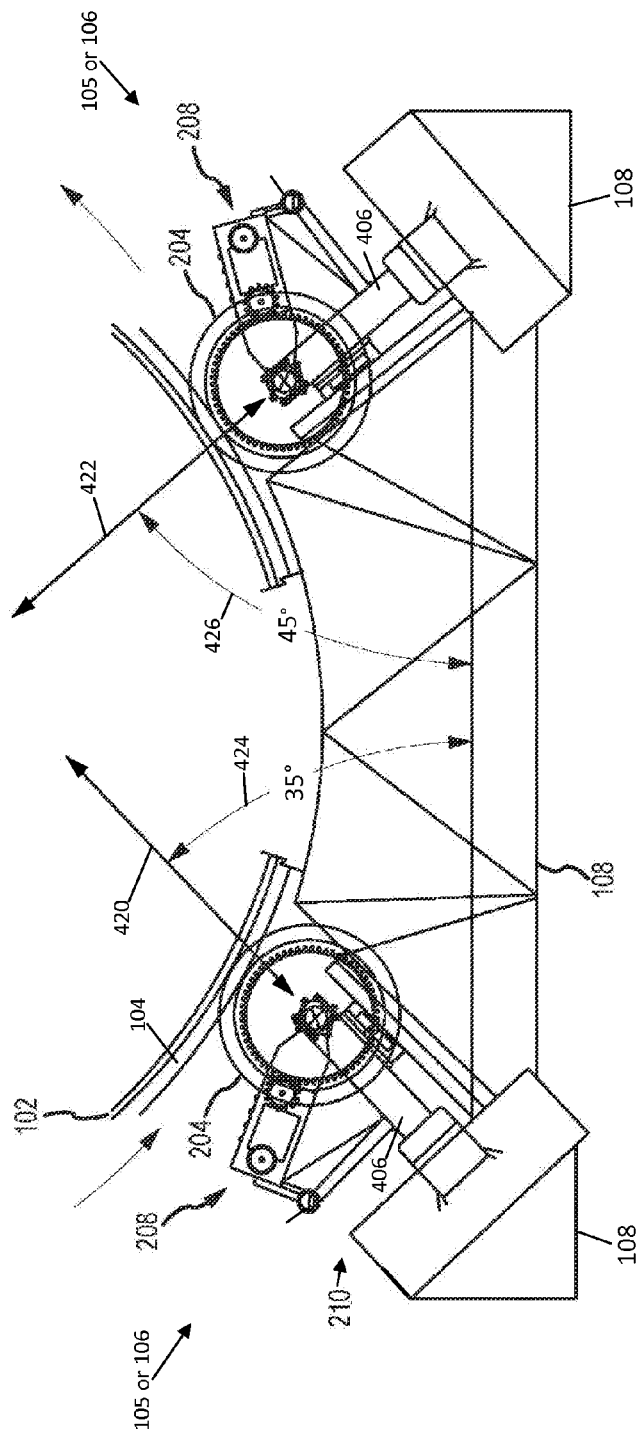
FIG. 4 is a diagram of an end elevation view of the drive system showing an example of the vectors of the drive system to maintain mechanical integrity, distribution of the forces and weight of the equipment between the sliding flat plate and hydraulic suspension and support systems.

As shown in FIG. 1, and as will be discussed in further detail below, wheel roller units, fixed anchor 105 and/or expansion 106, are provided and used for turning the rotary equipment 102. Each roller unit 105 or 106 comprises two flanged or rimmed wheels, an axle assembly, where the wheels are operably coupled to the drive axle assembly, which is driven by a dedicated gear system each with a dedicated traction motor, and supported by a sliding flat plate support system, a supplemental hydraulic support and suspension system, all of which are in communication with and a position control module. Please note that as shown in FIG. 3 and FIG. 4, but not shown in FIG. 1, each roller unit 105 or 106 is oppositely disposed to a corresponding second roller unit 105 or 106 on the opposite side of the rotary equipment.

As will be described in further detail in FIG. 2, the split rails 104 of the rotary or rotating equipment 102 sit atop the flanged or rimmed wheels of the fixed anchor roller units 105 or expansion roller units 106. The traction of the split rails 104 to the wheels of the fixed anchor roller units 105 or expansion roller units 106 is caused by the rolling friction between wheel and split rail 104 created by the weight of the rotating equipment 102 against each wheel. The rotating equipment 102 is then turned by the drive system of the roller unit 105 or 106, including fixed anchor roller units 105 or expansion roller units 106 turning the roller unit 105 or 106 axle assembly and consequently the rimmed wheels coupled to the axle assembly. As will be discussed in FIG. 7, fixed anchor roller units 105, have offset shoulders or smaller diameter sections where split sleeve thrust bearings support the axles and limit the horizontal movement of the axle assembly in relation to the hydraulic piston and flat plate support system. The restricted horizontal movement of the axle, in conjunction with the opposing flanged drive wheels, results in fixation of the horizontal position of that point of the rotary equipment. Conversely, for the expansion roller units 106, the operable connection between the hydraulic suspension and support system and the axle assembly provides a longer offset (wider shoulders) riding area for the split sleeve bearings, allowing limited horizontal movement of the axle in relation to the hydraulic suspension and support system.

The support, suspension, drive and position control system described herein enables variable rotational speed and speeds that are much higher than conventional rotating equipment. 102. As the multiple traction controlled flanged wheels rotate, the friction or traction between the wheels and the split rails 104 causes the rotating equipment 102 to rotate without the need for large pinion and girth gears surrounding the rotary equipment. The flanged or rimmed wheels of the roller units 105 or 106 impart a redundant backup horizontal position control for the rotary equipment 100 without the need for a large conventional horizontal thrust button (or wheel).

Figure 6:
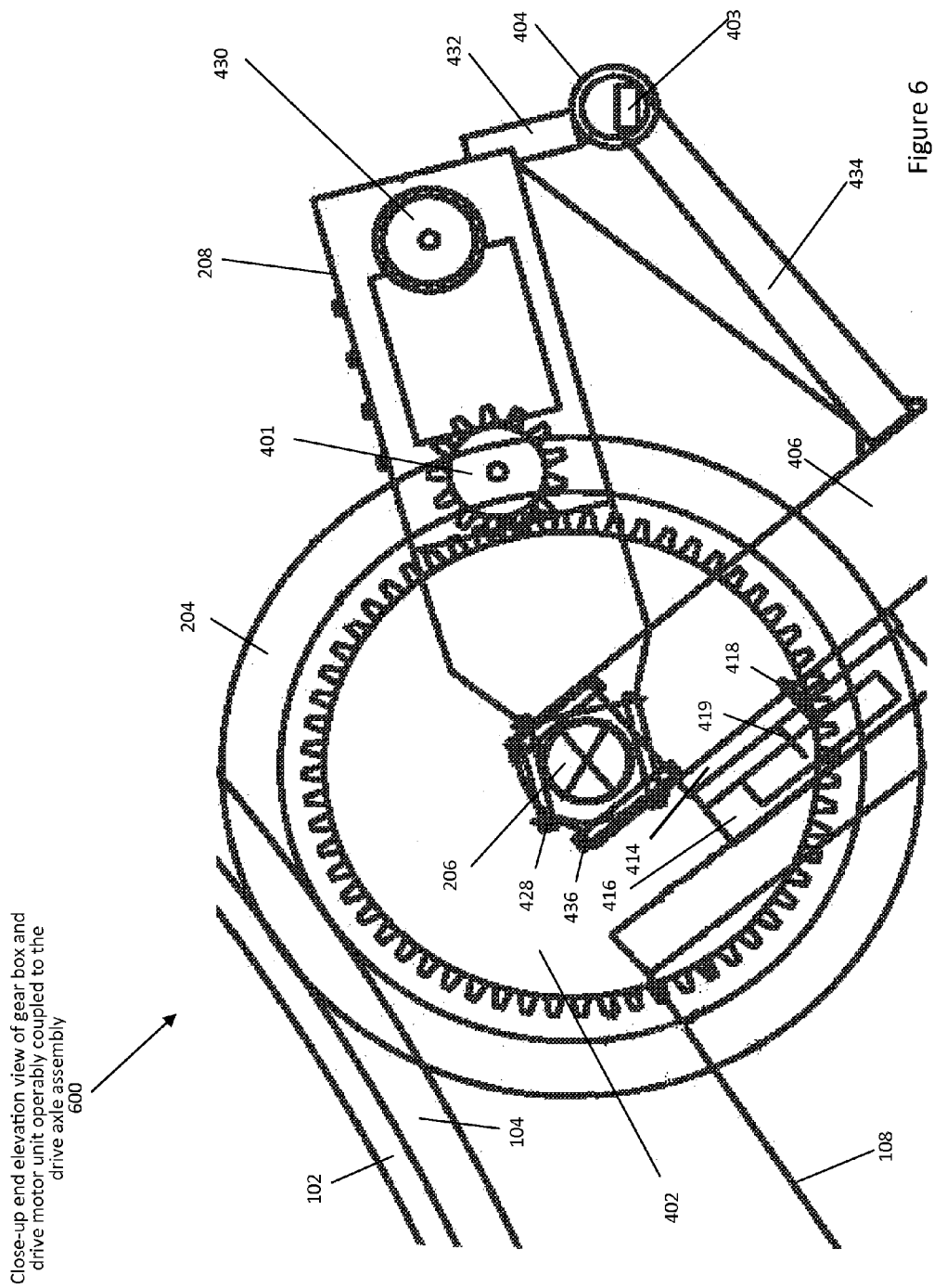
FIG. 6 is a diagram showing a close-up end elevation view of gear box and drive motor unit operably coupled to and supported by the drive axle and the hydraulic pistons.
Figure 7:
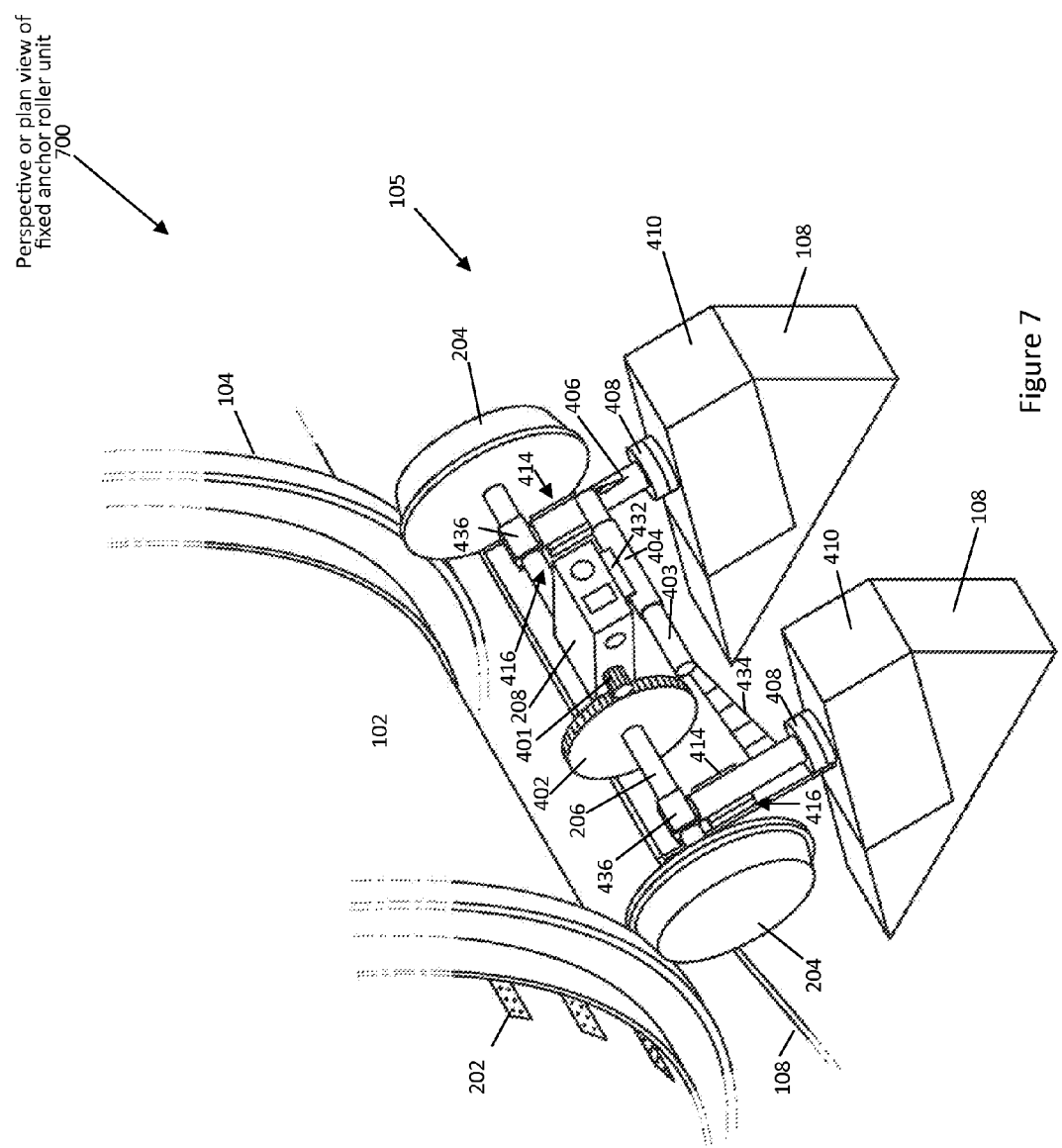
FIG. 7 is a diagram showing a perspective or plan view of fixed anchor roller unit

As will be shown and discussed in further detail in FIGS. 6 and 7, the rimmed wheels and respective drive axles are mounted on a hydraulic suspension and support system, which imparts vertical position control (equipment slope) and horizontal alignment by skewing the axle of the roller unit 105 or 106 slightly against the horizontal axis of the rotating equipment 102. The hydraulic movement of the wheel axle also enables vertical positioning and variable slope of the rotating equipment 102.

In the example drive system 100 shown in FIG. 1, nine opposing pairs of roller units 105 and 106 are illustrated but any number of roller units 105 or 106 may be used, including fixed roller units 105 or expansion roller units 106. Therefore, while this descriptive example has nine oppositely paired roller units 105 and 106, it should be understood that this description is applicable to any such system with other numbers of roller units, as will be understood by one skilled in the art, once they understand the principles of this invention. The modularity and resulting low cost of each roller unit also enables the use of redundant units, which in turn enables the rotary equipment to operate while one drive unit is removed for maintenance.

In an embodiment of the present disclosure, which will be discussed in further detail and shown in FIG. 2 and FIG. 4, a hydraulic suspension and support system operably coupled to the roller unit 105 and 106 is provided. The hydraulic suspension and support system adjusts automatically or by hand, the position of the wheels on the roller unit 105 and 106. In this way (angled upwards toward the center axis and partially supported vertically by the upper and lower sliding plates), an appropriate percentage of the weight of the rotating equipment 102, depending on the angle of the rotating equipment 102, is supported by hydraulic pressure and thus the hydraulic suspension and support system is functional and reactive to transitional forces and eccentricities in equipment shape but at the same time it is not exposed to the high pressure that would be caused by supporting the full weight of the rotary equipment. The hydraulic suspension and support system may be controlled by a computer, programmable logic controller ("PLC"), master logic controller or by hand (which will be discussed in further detail below). The hydraulic suspension and support system allows the drive system to adjust the position or location of the wheels to prevent slippage and improve the rolling friction between the wheel and the split rail 104 by maintaining constant contact and uniform pressure between the wheels and the split rails 104. The hydraulic suspension and support system may also adjust the position of the wheels to vary the slope of the rotating equipment 102 affording the opportunity for enhanced material processing and performance.

As shown in FIG. 1, each oppositely paired roller unit 106 is assembled to and supported on bogie (or truck) support structure 108. As shown in FIG. 3 and FIG. 4, the bogie support structures 108 provide the support framework for each oppositely paired roller unit 105 and 106, with one bogie support framework supporting said two oppositely disposed roller units 105 or 106 which in turn supports the rotating equipment 102 in its entirety. The bogie support structures 108 are relatively compact and light weight when compared to conventional rotating equipment support structures. The compact size of bogie support structures 108 afford the luxury of redundancy allowing one or two roller units 106 to be removed for service while the rotating equipment 102 continues to operate.

The series of bogie support structures 108 are operably coupled and supported by a support structure such as a steel truss 110 or W beam. As shown in FIG. 1, the steel truss 110 may be a single support structure that runs nearly the full length of the rotating equipment 102 and provides support to the bogie support structures 108 associated with each oppositely paired roller units 105 and 106. In the example drive system shown in FIG. 1, a steel truss 110 is provided for supporting nine (9) bogie support structures 108, however, as will be understood by one skilled in the art, a variety of support structure may be used to support the bogie support structures 108. The steel truss 110 is operably coupled and supported by a structure such as concrete 112, pilings or skid foundation. Alternatively, the longitudinal support truss may be replaced by one continuous concrete or compacted soil foundation as field conditions provide.

Figure 2:
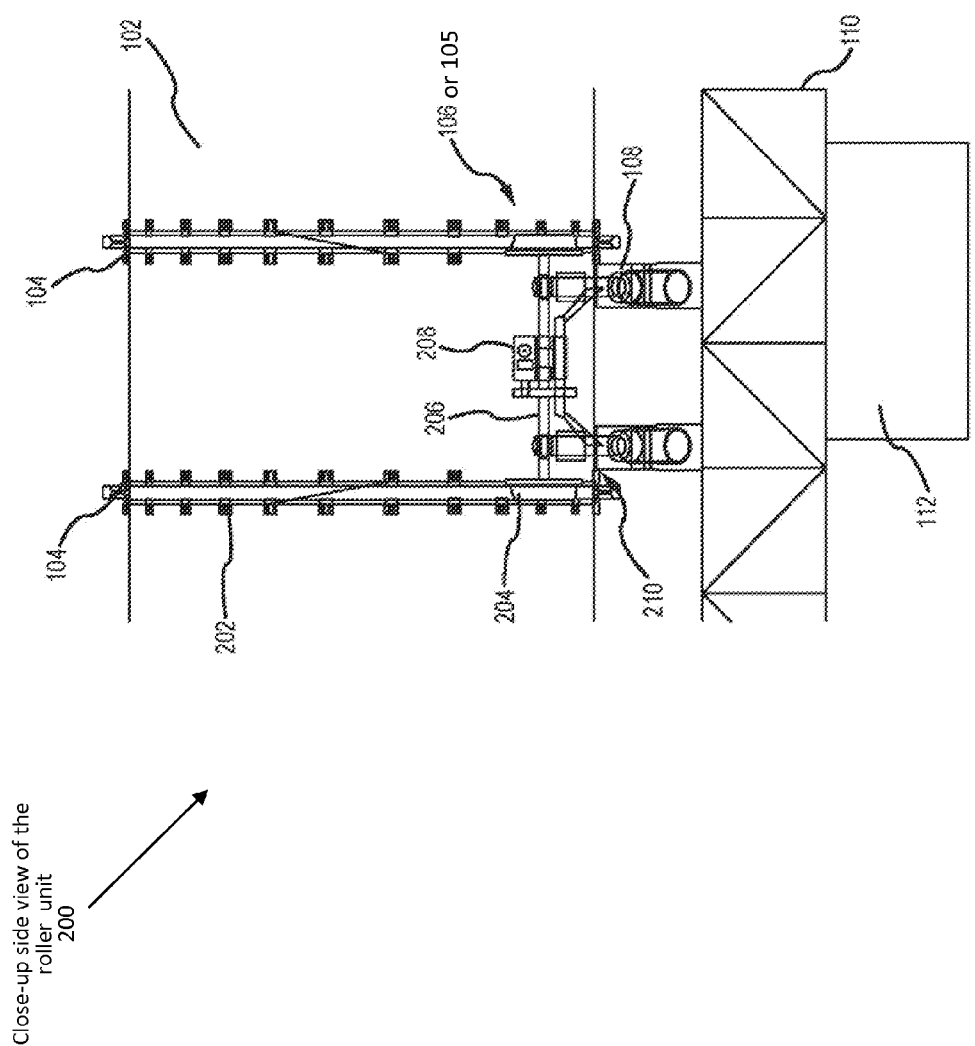
FIG. 2 is a diagram showing a close-up side view of the roller unit of the system of the present disclosure.

FIG. 2 provides a close-up view of the drive system 200, showing the rotating equipment 102 with one roller unit 105 and 106 and two split rails 104. As shown in FIG. 2, the split rails 104 are operably coupled to the rotating equipment 102, where as shown and to be discussed in FIG. 9a, a base plate (shown as 604 in FIG. 9a) is welded to the outer shell of the rotating equipment 102 and then clips 202 are operably coupled to the base plate, loosely holding the split rails 104 to the rotating equipment, but allowing the split rails 104 to move or walk slightly as is common with each rotation of the rotary equipment and also to allow for the expansion and contraction or the rotating unit 102. As will be understood by one skilled in the art, a wide variety of clips may be used to support the split rails 104 to the rotating equipment 102. The type of clips 202 used for operably coupling the split rails 104 to the rotating equipment 102 will depend on a wide variety of variables, including but not limited to, the size and weight of the rotating equipment 102, the materials to be processed in the rotating equipment 102, the speed of rotation of the rotating equipment 102, and the maintenance condition or eccentricities of the rotating equipment 102.

As shown in FIG. 1 and FIG. 2, the split rails 104 sit on the top of and frictionally adhere to the flanged or rimmed wheels 204 of the roller unit 105 and 106. The rimmed wheels 204 are operably coupled to a drive axle assembly 206, which is operably coupled to roller drive unit 208. As will be apparent to one skilled in the art, a variety of roller drive units 208 may be used to drive the drive axle assembly 206, including but not limited to a dedicated gear system with a dedicated fraction motor (shown and described in FIGS. 6 and 7).

Figure 8:
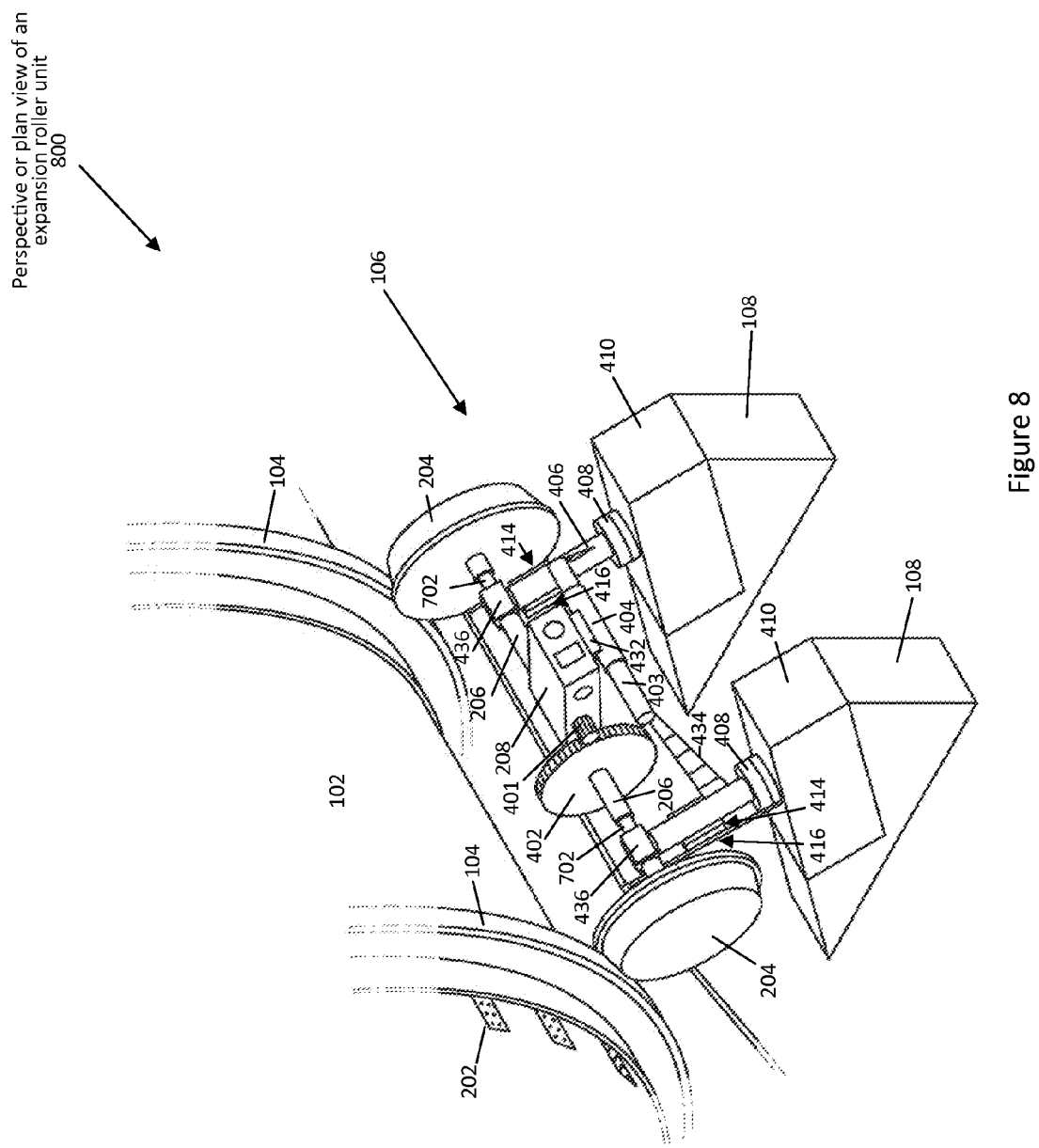
FIG. 8 is a diagram showing a perspective or plan view of an expansion roller unit.

In the example drive system shown in FIG. 2 and shown in further detail in FIG. 7 and FIG. 8, the rimmed wheels 204 have a tapered outer rim on one side of the wheel 204 but the wheel 204 may have also have a raised or tapered rim on each riding surface of the wheel. The tapered riding surface of each wheel has the desired effect of altering the circumferential speed of each wheel in order to compensate for slightly different split rail or drive wheel 204 outer diameters. The wheels 204, connected via a solid axle 206, can move laterally side-to-side to effect differential circumferential speed caused by differences in diameters, hence reducing unnecessary wheel-rail grinding in a manner similar to the taper that is used on railroad car wheels. Therefore, while this descriptive example has a tapered rim on the wheel, it should be understood that this description is applicable to any such system with other rims on the wheel, as will be understood by one skilled in the art, once they understand the principles of this invention. The wheels 204 of the present disclosure may be formed from a variety of materials, including but not limited to carbon steel, dual alloys stainless steel and nickel alloy matrix steels. The rims or flanges on the wheels mainly perform the backup function of preventing the equipment from becoming grossly misaligned due to various control or equipment failures, in a practice similar to the opposing rimmed wheels on rail cars holding the vehicle steadfast on the rails. The rims efficaciously replace the problematic and maintenance intensive "thrust roller" or "thrust button" that is used on existing conventional rotary equipment.

As shown in FIG. 2, the rimmed wheels 204 and corresponding drive axle assembly 206 of the roller unit 105 or 106 are mounted on a hydraulic suspension and support system 210. As will be discussed in further detail in FIG. 5, the hydraulic suspension and support system 210 imparts vertical position control (equipment slope) and alignment (if necessary) for the drive system of the present disclosure by adjusting vertically or skewing the axle assembly 206 of the roller unit 105 or 106 through the vertical adjustment of each individual hydraulic suspension and support system 210.

The hydraulic suspension and support system 210 also imparts pliant or flexible suspension of the wheels 204, which enables improved wheel contact and reduced wear and of various mechanical components of the rotating equipment 102.

The hydraulic suspension and support system 210 is also operably coupled to the bogie support structures 108, which provide a stable foundation to adjust the positions of the wheels 204. As discussed in FIG. 1 and shown in more detail in FIG. 2, the bogie support structures 108 are operably coupled and supported by a longitudinal foundation support structure such as a steel truss 110 or W beam, or a continuous longitudinal concrete foundation. As shown in FIG. 1, FIG. 2, and FIG. 3, the typical parallel pair of steel trusses 110 provide support to the bogie support structures 108 associated with each roller unit 106. The steel trusses 110 are operably coupled to and supported by a structure such as concrete 112, pilings or compacted soil foundation.

FIG. 3 provides an end elevation view 300 of the drive system of the present disclosure, showing two oppositely disposed flanged or rimmed wheel roller units 106 supported by a bogie support structure 108. As previously discussed in FIG. 1 and FIG. 2, rotating equipment 102 is provided with one or more split rails 104, which are operably coupled to the shell of the rotating equipment 102. The split rails 104 coupled to the rotating unit 102 are supported by and have frictional adherence to the rimmed wheels of the roller units 106 which are located opposite of each other, in pairs, along the length of the rotating equipment 102 as well as the bogie support structure 108. As shown in FIG. 3, each wheel 204 is operably coupled to each drive axle assembly 206. The drive axle assembly 206 is operably coupled to the hydraulic suspension and support system 210 and the support bearings on the pinion drive gear end (shown in FIG. 5) of the roller drive unit 208. The roller unit 106, comprising the two rimmed wheels on a common shaft or the axle assembly, and hydraulic suspension and support system, are operably coupled or fixed to the bogie support structures 108, which provides a chassis or structural support for both roller units 106. As shown in FIG. 3, a substantial engineered percentage of the weight of the rotating equipment 102 is supported by the hydraulic pressure of the hydraulic suspension and support system 210 while the upper and lower sliding flat plates likewise resting on the bogie support structure 108 provides synergistic support.

The bogie support structures 108 is a structure that provides support and a fixed point for each roller unit 105 or 106 positioned opposite to each other and arranged longitudinally in series along the length of the rotary equipment. As described in FIGS. 1 and 2, the bogie support structures 108 is supported by a steel truss 110. The steel truss 110 is supported by a piling or other foundation 112.

FIG. 4 provides a diagram of an end elevation view 400 of the drive system showing an example of the vectors of the drive system to maintain mechanical integrity, distribution of the forces and weight of the equipment between the sliding flat plate and hydraulic suspension and support systems. As will be understood by one skilled in art, a variety of vectors may be used to distribute the weight of the rotary unit, however an example of the vectoring, between 35 and 45 degrees from horizontal, is illustrated to perform the function of distributing the weight of the rotating equipment between the vectored sliding flat plates and the hydraulic cylinders.

As previously discussed in FIG. 1 and FIG. 2, a rotating equipment 102 is provided with one or more split rails 104, which are operably coupled to the shell of the rotating equipment 102. The split rails 104 are supported by and have frictional contact with the rimmed drive wheels of the roller units 105 or 106 which are located on opposite sides of the rotating equipment, in pairs, along the length of the rotating equipment 102. As shown in FIG. 4, a wheel 204 or as shown more advantageously in FIG. 7 and FIG. 8, a pair of wheels, are operably coupled to each drive axle assembly (as shown as 206 in FIGS. 2 and 3). The drive axle assembly is operably coupled to the hydraulic suspension and support system 210 and the roller driver motor and gearbox unit of the roller drive unit 208. As will be shown in FIGS. 7 and 8, the roller drive unit 208 (motor and gearbox) is supported on both inboard and outboard ends, with the inboard or first end support at the drive axle assembly 206 through bearings operably coupled to the drive axle and at the outboard or second end supported at the opposite end near the drive motor where it is supported by gussets operably coupled to the hydraulic pistons 406.

The roller units 105 or 106, comprising the two flanged or rimmed wheels, the axle assembly, and the drive motor and gearbox co-supported by sliding flat plates and hydraulic pistons, are operably coupled or fixed to the bogie support structures 108, which provides a chassis or structural support for roller units 105 or 106. As shown in FIG. 4, a percentage of the weight of the rotating equipment 102 is distributed between the sliding flat plates and the hydraulic cylinders of the hydraulic suspension and support system 210 in order to facilitate the functioning of each hydraulic cylinder.

Each roller unit 105 or 106 is positioned at a vector 424 and 426 to the rotating unit 102 in order to maintain traction between the wheels 204 and the split rails 104. The default vector 424 and 426 setting for each roller unit 105 or 106 in relation to the rotating unit 102 is 45°. However as shown in FIG. 4, based on the weight and consideration of both the direction and the magnitude of the driving torque of the drive wheels 204, the vectors 424 and 426 for each roller unit are shown at 35° 424 and 45° 426. As will be understood by one skilled in the art, each roller unit 105 or 106 maybe positioned at a vector range between 35° and 45° to the rotating unit 102.

As further shown in FIG. 4, each roller unit 105 or 106, through the hydraulic suspension and support system 210 has the ability to be adjusted vertically 420 or 422 depending in order to maintain traction between the wheel 204 and the split rail 104. As will be discussed in further detail, hand controllers or automated hydraulic pressure controllers adjust the pressure to the pistons 406 of each roller unit 105 or 106, allowing each roller unit 105 or 106 to move up or down as needed and to conform with changes in the equipment.

Figure 5:
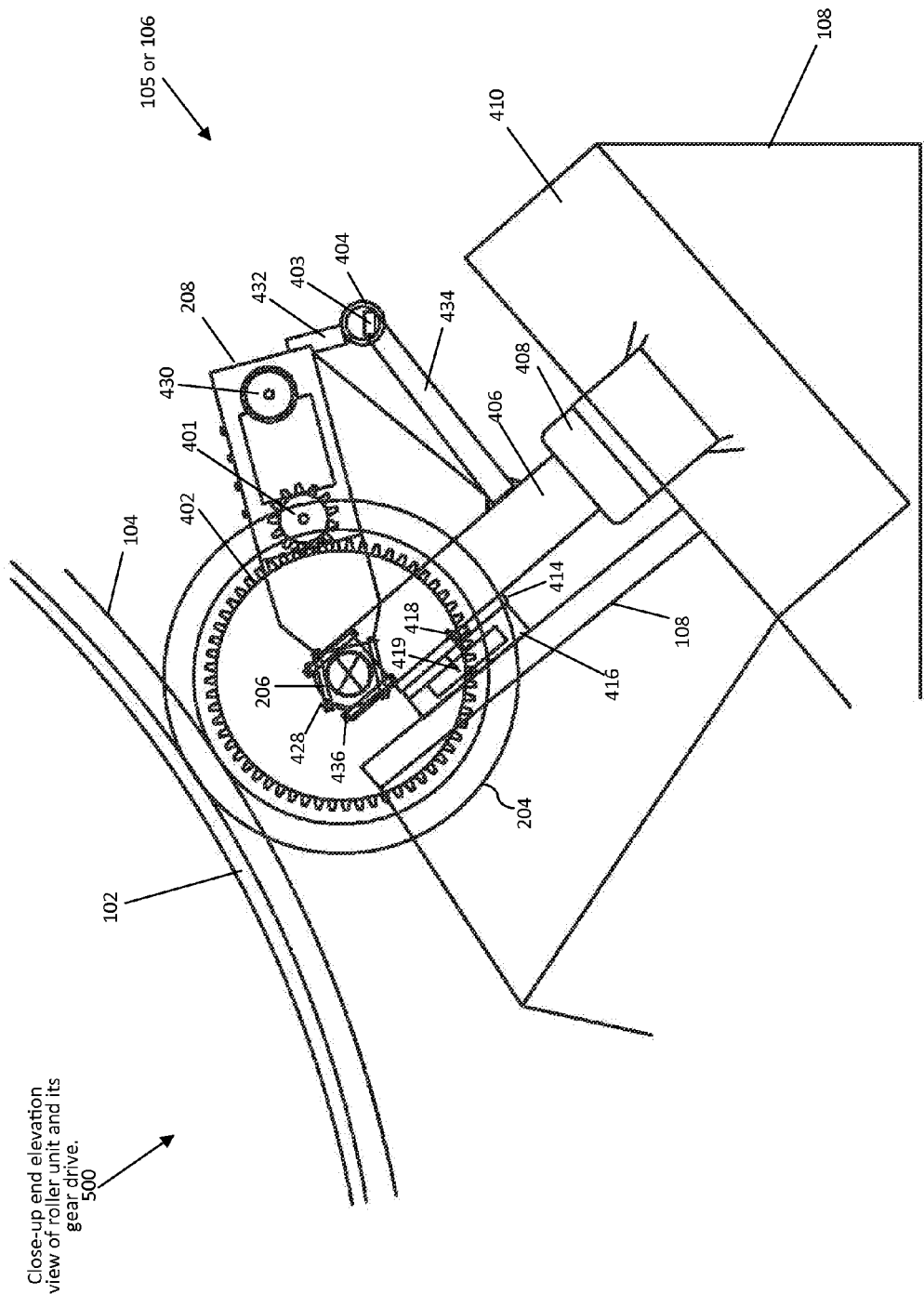
FIG. 5 is a diagram showing a close-up end elevation view of roller unit and its gear drive.

FIG. 5 provides a close-up end elevation view 500 of an example of the components of an individual roller unit 105 or 106. As shown in FIG. 5, a split rail 104 is shown operably coupled to the rotating equipment 102. The rotating equipment 102 is supported by and frictionally adheres to the rimmed wheel 204 of the roller unit 105 or 106 by means of the split rail 104. As discussed above, the weight of the rotating equipment 102 against the wheel 204 creates the rolling or kinetic friction that allows for the transmission of driving force to the split rail 104 from the wheel 204. The wheel 204 is operably coupled to the drive axle assembly 206. The drive axle assembly 206 in this example is a solid or straight axle, however as will be understood by one skilled in the art, additional types of axles may be used depending upon the specification of the rotating equipment 102. The drive axle assembly 206 is operably coupled to a driven gear 402, which is configured to mesh with the pinion drive gear 401 of the gear box of the roller drive unit 208, where the roller drive unit 208 comprises a pinion drive gear 401, gear box and motor 430. The motor 430 of the roller drive unit 208 moves the input gear of the gearbox (not shown in FIG. 5), which moves the output pinion drive gear 401 of the gearbox, which meshes with the driven gear 402, which turns the drive axle assembly 206, thus turning the rimmed wheels 204. The wheels 204, based on frictional adhesion in turn move the split rails 104, and which in turn have frictional adhesion with the rotating equipment 102, hence causing the rotary equipment to turn.

As will be discussed in further detail in FIG. 6 the roller drive unit 208 is operably coupled to the drive axle assembly 206 by bearings 428 operably coupled to the drive axle assembly 206. At the opposite end, the roller drive unit 208 is operably coupled to drive support gusset tube 404 by means of a gusset tube support structure 432. A support shaft 403 slides within the gusset tube 404. The roller drive unit 208 support shaft 403 is supported by a strut supporting gear box 434 which is operably coupled to the piston 406 and is capable of sliding laterally within the drive support gusset tube 404 with the benefit of suitable lubrication.

As will be understood by one skilled in the art, the arrangement of the pinion drive gear 401, driven gears 402 and the roller drive unit 208 bearing attachment (shown as 428 in FIG. 6) to the drive axle assembly 206 of the present disclosure is similar to drive systems used in the railroad industry. However as will also be understood by one skilled in the art, other gearbox arrangements and axle attachments such as a limited slip or non-slip planetary or differential gearboxes with integrated outbound bearings and an enclosed housing with oil pan, commonly used in automobiles and other vehicles, may also be used.

As shown in FIG. 5, the drive axle assembly 206 is also operably coupled to a piston 406 of the hydraulic suspension and support system 210 by means of a sleeve or other type of thrust bearing (identified as 436 in FIGS. 6-8) located at the top of the piston 406. An upper flat plate 414 is operably coupled to the piston 406 and, with guidance provided by means of a kingpin 419 it mates on top of a lower flat plate 416, together comprising the flat plate support system. The lower flat plate 416 is slotted to allow the mating kingpin 419 to have coordinated movement with the hydraulic piston 406 within certain design limits. The upper flat plate 414 and the lower flat plate 416 allow the piston 406 to rest and slide on the top of the bogie support structure 108 as the piston moves vertically or as the entire roller unit 105 or 106 moves with traction maintenance requirements or eccentricities in the rotary equipment shell 102. A grease zerk or other type lubricant injector 418 provides access for lubricating the upper flat plate or sliding plate 414, the lower flat plate or sliding plate 416 and the kingpins 419.

The piston 406 is housed within a hydraulic cylinder 408. In the hydraulic cylinder 408, changes in hydraulic pressure causes the piston 406 to move towards the center axis of the rotating equipment, providing vertical position control and traction control for the drive system interface with the split rail or tyre 104 operably coupled to rotating equipment 102. As discussed above, the active or controlled type of hydraulic suspension and support system provides both vertical position control (equipment slope) and alignment (if necessary) by skewing the axle assembly of the roller unit 105 or 106 slightly against the rotating equipment. The hydraulic movement of the wheels 204 also enables vertical positioning and variable slope of the rotating equipment 102. The movement of the piston 406 is usually with a 35° to 45° degree vector which allows the wheel 204 to maintain a constant and controlled friction with the split rail 104 and appropriate distribution of the weight of the rotary equipment. As will be discussed in further detail below, a variety of mechanisms may be employed to control the movement of the piston 406 though the hydraulic cylinder 408, including computer, PLCs or by hand. The hydraulic cylinder 408 is operably coupled to a stationary cylinder base 410, which is affixed to the bogie support structures 108. As will be discussed in FIG. 11, an additional embodiment may include the integration of pumps, check valves, pressure relief valves, control valves, and reservoirs to supply oil to the hydraulic cylinders.

In an additional embodiment described herein, the active hydraulic suspension and support system may be employed to adapt to changes in foundation support (not shown in FIG. 5). Automatic or hand control changes in the roller units 105 and 106 may be used to adapt to foundation settling or heaving, as well as rotary equipment mechanical imperfections and deformations, such as shell eccentricities that are commonly also described as out-of-roundness and "banana" bending of the rotary equipment cylinder or drum.

FIG. 6 provides a close-up view of the support and attachment of the gearbox and drive motor unit operably coupled to the drive axle assembly 600. As shown in FIG. 6, the roller drive unit 208 is capable of providing continuous and machine specification mesh between the gearbox output pinion drive gear 401 of the roller drive unit 208 and the larger axle driven gear 402. The roller drive units 208 described herein are supported on two ends, both inboard and outboard, where on the inboard drive axle assembly end, the roller drive unit 208 is operably coupled to the drive axle assembly 206 by bearings 428 operably coupled to the drive axle assembly 206. At the opposite end or outboard end, the roller drive unit 208 is operably coupled to drive support gusset tube 404 by means of a gusset tube support structure 432. A support shaft 403 slides within the gusset tube 404 allowing the roller drive unit 208 to move congruously in both the lateral (horizontal) direction (with the lateral movement of the rotary equipment 102 and the drive axle assembly 206) and vertically in conjunction with the drive axle assembly 206 along the lines of the vectors of the hydraulic suspension support in order to maintain traction between the wheel 204 and the split rail 104. The roller drive unit 208 support shaft 403 is supported by a strut supporting gear box 434 which is operably coupled to the piston 406. The roller drive unit 208 support shaft 403 is capable of sliding laterally within the drive support gusset tube 404 with the benefit of suitable lubrication.

The outer support of the roller drive unit 208 does not necessarily have limits on how far its support tube 404 can slide on the support shaft 403. The limits of lateral movement of the drive unit 208 are determined by the limits of movement of the drive axle assembly 206, which is determined by raised faces (shoulders) on the drive axle assembly 206.

The drive axle assembly 206 is also operably coupled to a piston 406 by means of a bearing 436 located at the top of the piston 406. FIG. 6 shows again a close up view of the upper flat plate 414 and lower flat plates 416, as operably coupled by the kingpin 419 to the piston 406, allowing the piston to slide on the top of the bogie support structure 108 as the piston 406 moves vertically or as the entire roller unit moves with fraction maintenance requirements or eccentricities in the rotary equipment shell 102. Again the grease zerk or other type lubricant injector 418 provides access for lubricating the upper sliding plate 414, the lower sliding plate 416 and the kingpins 419.

FIG. 7 provides a perspective or plan view of a fixed anchor roller unit 600. As shown in FIG. 7, the split rails 104 are operably coupled to the rotating equipment 102 and supported by clips 202. The split rails 104 sit on the top of the rimmed wheels 204 of the roller unit 105. The rimmed wheels 204 are operably linked to a drive axle assembly 206. The drive axle assembly 206 is operably coupled to a driven gear 402, which is configured to mesh with the output gear or pinion drive gear 401 of the gearbox of the roller drive unit 208. The roller drive unit 208 moves the driven gear 402 which is meshed with the pinion drive gear 401, which turns the drive axle assembly 206, thus turning the rimmed wheels 204.

FIG. 7 and FIG. 8 also show two hydraulic suspension pistons 406, associated hydraulic cylinders 408 and cylinder bases 410 operably coupled on each side of the bogie support structures 108 with each piston 406 operably coupled to each side of the drive axle assembly 206. As discussed above, changes in hydraulic pressure, either automated or by hand, allow the pistons 406 to move up and down within the hydraulic cylinder 408 of each hydraulic suspension and support system. This movement of the pistons allows changes in vertical position control (equipment slope) and alignment (if necessary) of the rotating equipment 102 by skewing the axle assembly 206 of the roller unit 106 slightly in relation to the longitudinal axis of the rotating equipment 102 while also allowing the hydraulic suspension and support system to act as a shock absorber and maintain traction between the rimmed wheels 204 and the split rails 104.

As shown in FIG. 7, for a fixed anchoring roller unit 105, the piston 406 is connected to the drive axle assembly 206 with a sleeved or other type of thrust bearing 436 located at the top of the piston 406. As shown in FIG. 7, the fixed anchor roller unit 105 has a complete solid axle 206 with closely spaced shoulders on each side of the thrust bearings that prevent any lateral movement of the drive axle assembly 206 in relation to the thrust bearing 436 and the piston 406. That is, the shoulders on the sections of the axle or shaft 206 with smaller diameter fit tight against both sides of the thrust bearing. By thus preventing lateral movement of the anchoring drive roller unit 105 and drive axle assembly 206, in conjunction with the opposing flanged (rimmed) drive wheels 204, a backup mechanical horizontal alignment control system is provided.

FIG. 7 and FIG. 8 also provides a perspective view of the upper flat plate 414 operably coupled to the piston 406 and to the lower flat plate 416 with guidance provided by means of a kingpin (shown as 419 in FIGS. 5 and 6). As shown in FIG. 7, the upper flat plate 414 and the lower flat plate 416 allow the piston 406 to rest and slide on the top of the bogie support structure 108 as the piston moves vertically or as the entire roller unit 105 or 106 moves with expansion. Note that the slot in the lower flat plate 416 in which the kingpin resides runs in a direction aligned with the direction of the hydraulic piston 406. Hence, the lower flat plate 416, which is anchored to the bogie support structure 108, serves to prevent lateral movement of the drive axle, the rimmed drive wheels, and hence the rotary equipment.

FIG. 7 illustration of the anchor roller unit also provides a view of the roller drive unit 208 support shaft 403 located on the outboard side of the roller drive unit 208. The roller drive unit 208 support shaft 403 is allowed to slide axially (laterally), according to any small lateral movement of the drive axle, within the drive support gusset tube 404 by means of a sliding shaft within the drive support gusset tube 404.

As discussed above, the piston 406 is coupled to the hydraulic cylinder 408. Within the hydraulic cylinder 408, changes in hydraulic pressure move the piston 406 vertically, providing vertical position control and continuous traction control for the rotating equipment 102.

FIG. 8 provides a perspective or plan view of an expansion roller unit 106, which allows for horizontal movement of the drive axle in relation to the hydraulic support components including the piston and 406 and hydraulic cylinder 408, and the fixed bogie support structure 108. As shown in FIG. 8, for an expansion roller unit 106, the piston 406 is again connected to the drive axle assembly 206 with a sleeve or other type of thrust bearing 436 located at the top of the piston 406. However, unlike the axle of the fixed axle assembly 105, the drive axle assembly 206 of the expansion roller unit 106 has two sections of the shaft axle 206 with a smaller diameter, where a thrust sleeve or other type bearings reside, with more widely spaced shoulders 702 on the shaft of the drive axle assembly 206, allowing limited but some measure of lateral movement, according to larger scale lateral movement of the rotary equipment caused by thermal expansion or contraction, of the drive axle assembly 206 in relation to the thrust bearings 436 and its respective laterally anchored pistons 406.

Figure 9C:
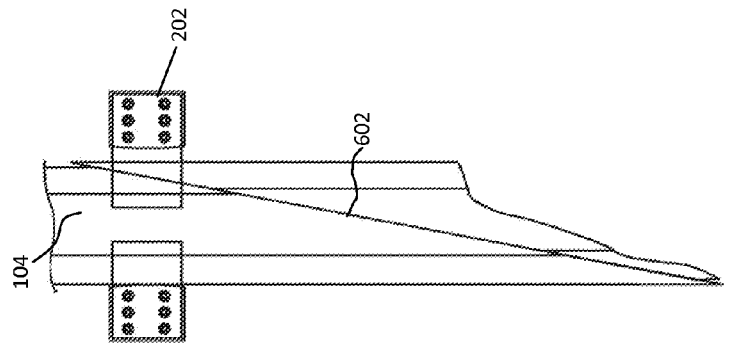
FIG. 9c is diagram showing a close-up view of a split rail illustrating an overlap at the junction of two split rails under cold conditions coupled to the rotary equipment shell.
Figure 9B:
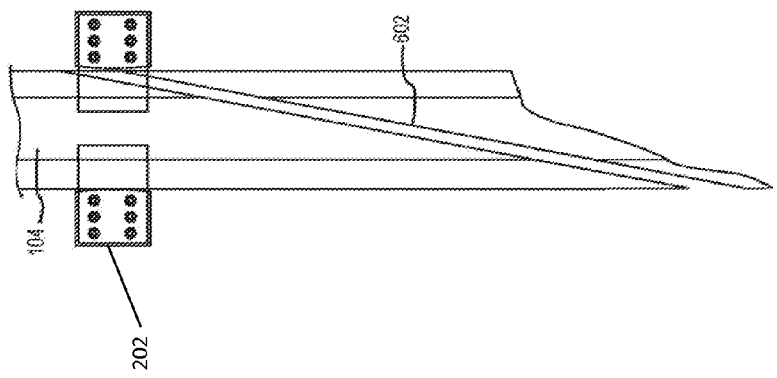
FIG. 9b is diagram showing a close-up view of a split rail illustrating a small gap at the junction of two split rails under hot conditions coupled to the rotary equipment shell.
Figure 9A:
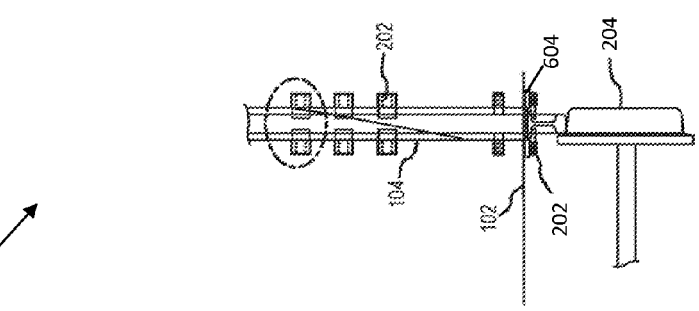
FIG. 9a is a diagram showing a close-up view of a rimmed or flanged drive wheel and the split rail coupled to the rotary equipment shell.

FIG. 9a, FIG. 9b and FIG. 9c provide three different close-up views 900 of the attachment of a split rail 104 operably coupled to the rotating equipment 102. As shown in FIG. 9a the split rail 104 is operably coupled to the rotating equipment 102 by means of a split rail clip 202, similar to the clip that is used in railroads to secure the rail to the railroad tie. A baseplate 604, which may or may not be used, depending upon the application, is welded to the outer shell of the rotating equipment 102. A pad is placed on top of the baseplate 604 and the split rail 104 is rolled the hard way to conform to the diameter of the rotating equipment 102 and placed on top of the pad. Clips 202, operably coupled to the rotating unit 102 are positioned to couple the split rail 104 to the rotating unit 102 while also allowing the split rail 104 to move with expansion and contraction.

FIG. 9b shows an example of the split rail 104, showing an example of the split 602 or gap where the ends of the split rails 104 come together. The split 602 in FIG. 9b shows a gap which might occur when the rotary equipment thermally expands.

FIG. 9c shows a second example of the split rail 104, where the split 602 or gap is non-existent in a cold condition where the two ends of the split rail 104 come together and overlap by a calculated distance. When the rotary equipment heats up and expands, the overlap will disappear and the split rails will be adjoining in the normal (hot) operating condition, hence presenting a continuous split rail surface contact with the drive wheels 204, and hence minimizing a bump occurring on the passing of a split rail gap on each revolution. Note that the point overlap is typically optimized for the direction of split rail travel with respect to the contact with the drive wheel 204 in order to avoid a conflict between the wheel and the point sticking out in the cold (overlap) condition.

Figure 10:
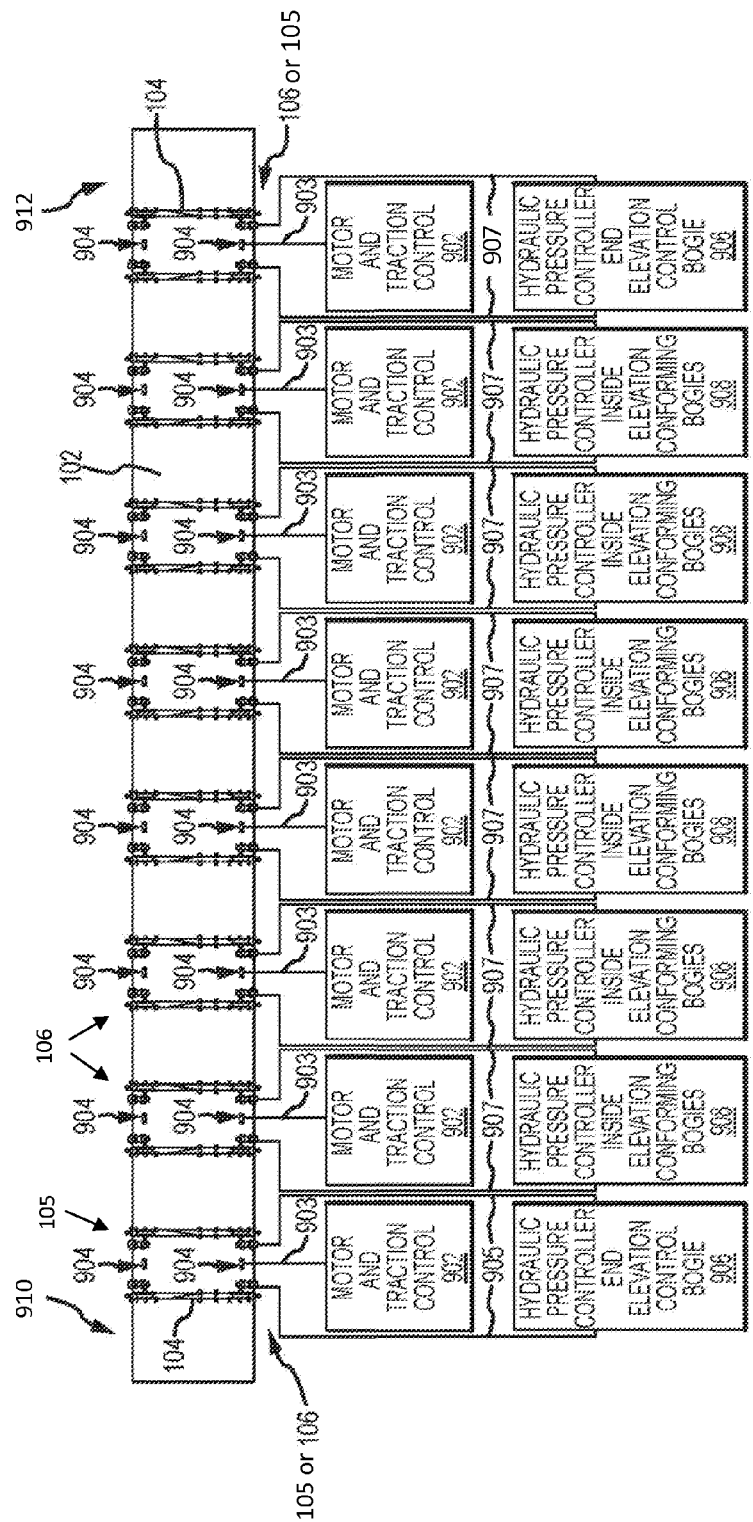
FIG. 10 is a diagram showing an overview of the controls of the drive system.

FIG. 10 provides a diagram showing an overview of the controls of the drive system described herein 1000. As shown in FIG. 10, and previously discussed in FIGS. 1-9, a series of split rails 104 are operably coupled to the rotating equipment 102. The rotating equipment 102 is placed on top of the roller units 105 or 106 by means of the split rails 104, where the traction between the roller units 105 or 106 and the split rails 104 is provided by the rolling friction between the roller units 105 or 106 and the split rails 104.

One or more speed and power sensors 904 are operably coupled to the rotating equipment 102 and to the roller units 105 and 106. In the example provided, each sensor 904 is established and positioned between each set of split rails 104 and to each set of roller units 105 or 106. A variety of sensors 904 may be used as described herein to establish data related to the speed of rotation of the rotating equipment 102 and the roller units 105 and 106, including but not limited to RFID, GPS, Pulsed-RF UWB and NFER systems or other systems which determine the speed, power and traction parameters of the equipment and send a signal 903 to a central processing unit or PLC regarding the location and speed of the sensors 904 in relation to the rotating equipment 102.

In a further embodiment, a speed sensor, power sensor, and traction control sensor or traction measuring system may also be positioned to monitor the rotation of the wheels operably coupled to each drive axle assembly. A variety of speed sensors including speed sensing tachometers may be used to establish data related to the speed of wheels, including but not limited to RFID, GPS, Pulsed-RF UWB and NFERrara systems or other systems. The data from the wheels may then be communicated to the a logic unit within the motor speed and traction control or controller 902 where the data related to the speed of the wheels may be compared with the data from the speed sensor 904 (corrected for gearing and wheel/split rail diameter ratios) related to the speed of the rotation of the rotary unit. This information can be used by the logic unit to identify a loss of traction or slippage based on a difference in the speed of the rotation of the wheels in relation to the speed of the rotation of the rotary unit. The motor and fraction controller may then adjust the speed of the wheels to prevent the loss of traction and slippage. As will be understood by one skilled in the art, a master logic controller (not shown in FIG. 10) may also be used to analyze the data from the various speed sensors and to identify a loss of traction or slippage. The master logic controller, following instructions from various computer program set points and algorithms, may then adjust the speed of the wheels to prevent the loss of traction and/or it may adjust the position of the hydraulic pressure controller 908 to improve the contact between the wheels and the split rails.

In a further embodiment of the present disclosure, a power consumption sensor may be integrated or embedded into the motor speed and traction controller 902 in the form of an integrated circuit (not shown in FIG. 10). The power consumption sensor monitors and controls the power to each roller unit 105 or 106 while also distributing work input to the wheels and maintains the traction between the split rails 104 and the roller unit 105 or 106.

As shown in FIG. 10, one or more motor speed and traction controllers 902 are provided. Each motor speed and traction controller 902 corresponds to the location of each roller unit 105 or 106. The motor speed, and fraction controller 902 comprise various forms of logic, such as a central processing unit or a PLC, which monitors the speed of the rotating equipment 102 and the roller units 105 or 106 as well as the traction between the roller units 105 or 106 and the split rails 104. The motor speed, and fraction controller 902 receives data 903 from the one or more sensors 904 positioned on the rotating equipment 102 and roller units 105 and 106 regarding speed of the rotation of the rotating equipment 102. Based on the data from the speed sensors 904 and power consumption sensors, the motor speed and traction controller 902 is able to adjust the speed of the rotation of the wheels of the individual roller units 105 or 106 operably coupled to the bogie support structures (as shown in FIGS. 1-9), adjusting the speed of the wheels causing rotation of the rotary equipment 102.

It will be appreciated by one skilled in the art that various types of power supplies may be used to supply the power necessary for the motor and traction controller 902. These sources of power may include but are not limited to battery, converters for line power, solar and/or wind power. It will also be appreciated by one skilled in the art the support circuitry that will be required for the motor and traction controller 902. Further, it will be appreciated that the configuration, installation and operation of the required components and support circuitry are well known in the art. The program code necessary for performing the operating instructions and rules disclosed herein will be dependent upon the particular processor and programming language utilized in the motor and traction controller 902. Consequently, it will be appreciated that the generation of program code from the disclosure presented herein would be within the skill of an ordinary artisan.

As further shown in FIG. 10, a series of hydraulic pressure controllers 906 and 908 are provided along the length of the rotating equipment 102 in association with each roller unit 105 or 106. The hydraulic pressure controllers 906 and 908 control and monitor the active hydraulic suspension and support systems shown in FIGS. 2-9. These hydraulic pressure controllers 906 and 908 provide horizontal position control and alignment of the rotating equipment 102 by skewing the axle assembly of the roller unit 105 or 106 slightly against the rotating equipment 102. This allows the hydraulic pressure controllers 906 and 908 to adjust 905 and 907 and in turn adjust the position of the wheels of the roller unit 105 or 106 to effect change the horizontal position of the rotary equipment according to control set points.

Figure 11:
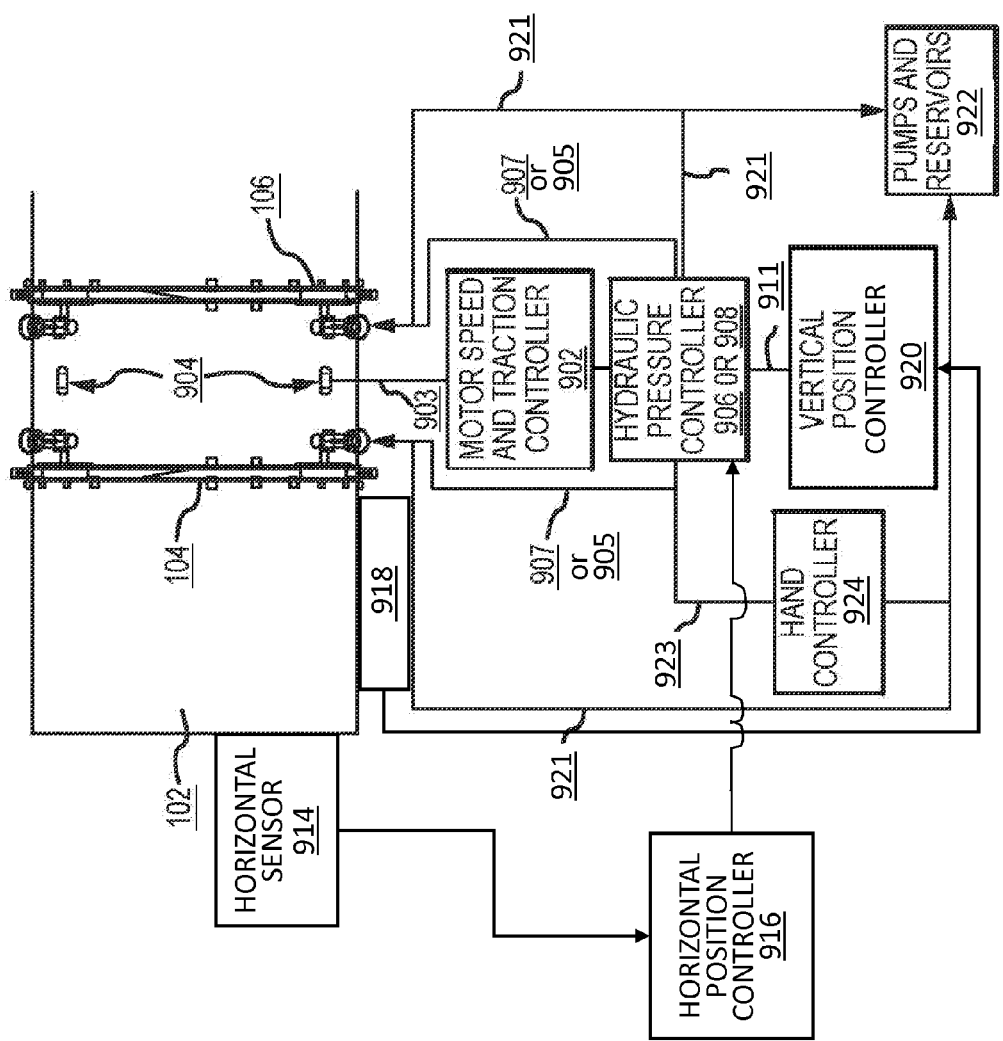
FIG. 11 is a diagram showing a close-up view of the controls associated with the support, suspension, drive and position control of the system.

A further embodiment of the present disclosure provides vertical control sensors (not shown in FIG. 10, but is shown in FIG. 11) which are in communication with the hydraulic pressure controllers 906 and 908. The vertical control sensors 918 in FIG. 11 monitor the shape and vertical position of the rotating equipment and send data related to the shape and vertical position of the rotating equipment to the hydraulic pressure controllers 906 and 908, which allows the hydraulic pressure controllers 906 and 908 to adjust 905 or 907 the position of the wheels of the roller units 105 and 106 to effect change the vertical position of the rotary equipment according to control set points.

Besides horizontal and vertical position control and alignment, the hydraulic pressure controllers 906 and 908 perform suspension and shock absorption functions for each roller unit 105 or 106 and associated bogie support structure. This is performed by the hydraulic pressure controllers 906 and 908 opening a pump discharge valve (not shown in FIG. 10) to a particular hydraulic cylinder 408 (shown in FIGS. 4-7) when the pressure to the hydraulic cylinder 408 is low. The hydraulic pressure controllers 906 and 908 may also open a valve to a return reservoir (not shown in FIG. 10), allowing hydraulic pressure to be released from a hydraulic cylinder and returned to the reservoir. A variety of hydraulic pressure controllers may be used, however in an embodiment of the present disclosure a hydraulic pressure controller 906 is operably coupled to the bogie support structure on the fixed end 910 and the opposite end 912 of the rotating unit 102 and a hydraulic pressure controller 908 is operably coupled to the bogie support structures supporting the middle of the rotating unit 102.

It will be appreciated by one skilled in the art that various types of power supplies may be used to supply the power necessary for the hydraulic pressure controllers 906 and 908. These sources of power may include but are not limited to battery, converters for line power, solar and/or wind power. It will also be appreciated by one skilled in the art the support circuitry that will be required for the hydraulic pressure controllers 906 and 908. Further, it will be appreciated that the configuration, installation and operation of the required components and support circuitry are well known in the art. The control algorithms and program code necessary for performing the operations disclosed herein will be dependent upon the particular processor and programming language utilized in hydraulic pressure controllers 906 and 908. Consequently, it will be appreciated that the generation of program code from the disclosure presented herein would be within the skill of an ordinary artisan.

As will be understood by one skilled in the art, a master logic controller (not shown in FIG. 10) may also be used to analyze the data from the various speed sensors, power consumption sensors, traction control sensors or traction measuring systems, vertical position control sensors and the horizontal position control sensors. Based on an analysis of the data from the various sensors the master logic controller may then adjust 903 the speed of the wheels to prevent the loss of traction and/or may adjust 905 and 907 the position of the hydraulic suspension and support system to improve the contact and traction between the wheels and the split rails.

FIG. 11 shows a close up view of control system 1100 of the support, suspension, drive and position control system. As shown in FIG. 11, and previously discussed in FIGS. 1-8, two split rails 104 are operably coupled to the rotating equipment 102. The rotating equipment 102 is placed on top of the roller units 105 or 106 by means of the split rails 104. One or more speed and power sensors 904 combining to form a traction measuring system are operably coupled to the rotating equipment 102 and drive roller units 105 and 106. In the example provided, each speed sensor, power sensor and traction control sensor or traction measuring system 904 is established and positioned between each set of split rails 104 and corresponding to the location of each set of roller units 105 and 106. As discussed in FIG. 10, the speed sensor, power sensor, traction control sensor and/or traction measuring systems 904 determine the speed of the rotating equipment 102 and send a signal 903 to the motor speed and traction controller 902 and on to the hydraulic pressure controller 906 and 908 where a central processing unit, master logic controller or PLC processes the data and makes any necessary adjustments according to pre-determined control algorithms to achieve desired distribution of power and traction.

As shown in FIG. 11, the motor speed and traction controller 902 corresponds to the location of roller unit, shown as an expansion roller unit 105 or 106. The motor speed and traction controller 902 comprises various forms of logic, such as a central processing unit or a PLC, which processes the data from the speed sensor, power sensor, traction sensor and/or traction measuring system 904 and monitors the speed of the rotating equipment 102 and the roller unit 106 as well as the traction between the roller unit 105 or 106 and the split rails 104. Based on the data from the speed sensor, power sensor, traction sensor and/or traction measuring system 904, the motor speed and traction controller 902 is able to adjust the speed of the wheels of the roller unit 106 operably coupled to the bogie support structures (as shown in FIGS. 1-7), adjusting the speed of the wheels causing rotation of the rotating equipment 102.

The motor speed and traction controller 902 also contains a current and power controller, which is integrated into the motor speed and traction controller 902, which monitors and controls the power to each roller unit 106 by means of a power consumption sensor (an AC kilowatt-kilovar meter, for an AC electric motor, for example), while also distributing work input to the wheels and maintains the traction between the split rails 104 and the roller unit 105 or 106. Programming of the motor and traction controllers may include special controls and algorithms for difficult starting under load. The program would automatically stop the drive motors under excessive starting load and/or loss of traction, allowing the unit to roll back under gravity, and then restart when the unit rolls forward with an "assist" from gravity momentum in the forward direction.

As further shown in FIG. 11 and discussed in FIG. 10, a hydraulic pressure controller 906 or 908 is provided in association with the roller unit 105 or 106. The hydraulic pressure controller 906 or 908 controls and monitors the active hydraulic suspension and support systems shown in FIGS. 2-7, which provide vertical position control and alignment of the rotating equipment 102 by skewing the axle assembly of the roller unit 106 slightly against the rotating equipment 102 allowing the hydraulic pressure controller 906 or 908 to adjust the position of the wheels of the roller unit 106 based on process changes, foundation movement, or the shape, eccentricities, and horizontal position of the rotating equipment.

As further shown in FIG. 11, an embodiment of the present disclosure provides a hand controller 924, which allows an individual to bypass 923 and 907 the hydraulic pressure controller 906 or 908 and to manually adjust the position of the wheels of the roller unit 106, based on various aberrant conditions including alignment testing, operator training, special adjustment for the shape of the rotary equipment, and special needs for changing the horizontal or vertical positions of the rotary equipment. The hand controller 924 also allows an individual to manually release pressure from the hydraulic cylinders (shown in FIG. 4 and FIG. 5) and send hydraulic fluid via 907 control back to reservoirs 922, such as in situations where the roller unit 106 is being removed for service and maintenance.

As shown in FIG. 11 and discussed in FIG. 10 explanations, a further embodiment of the present disclosure provides vertical position control sensors 918, which are in communication with a vertical position controller 920. The vertical position control sensor 918 monitors the shape and vertical position of the rotating equipment 102 and sends data related to the shape and vertical position of the rotating equipment 102 to the vertical position controller 920 which processes the data and then sends 911 the information to a hydraulic pressure controller 906 or 908. This data allows the hydraulic pressure controller 906 or 908 to adjust the position of the wheels of the roller units 106 in relation to the shape of the rotating equipment 102.

As shown in FIG. 11 a further embodiment of the present disclosure provides horizontal position control sensors 914, which are in communication with a horizontal position controller 916. The horizontal position control sensor 914 monitors the horizontal position of the rotating equipment 102 and sends data related to the horizontal position of the rotating equipment 102 to the horizontal position controller 916 which processes the data and then sends the information to a hydraulic pressure controller 906 or 908. This data allows the hydraulic pressure controller 906 or 908 to adjust the position of the wheels of the roller units 106 in relation to the desired set point horizontal position of the rotating equipment 102.

As shown in FIG. 11 and previously discussed in FIG. 10, the hydraulic pressure controller 906 or 908 also performs suspension and shock absorption functions for each roller unit 106 and associated bogie. This is performed by the active hydraulic suspension pressure controller 906 or 908 sending a signal 921 to open a pump 922 discharge valve to a particular hydraulic cylinder 408 (shown in FIGS. 4-9) of the roller unit 106 when the pressure to the hydraulic cylinder 408 is low. The hydraulic pressure controller 906 or 908 may also send a signal 921 to open a valve to a return reservoir 922, allowing hydraulic pressure to be released from a hydraulic cylinder and returned to the reservoir 922.

Figure 12:
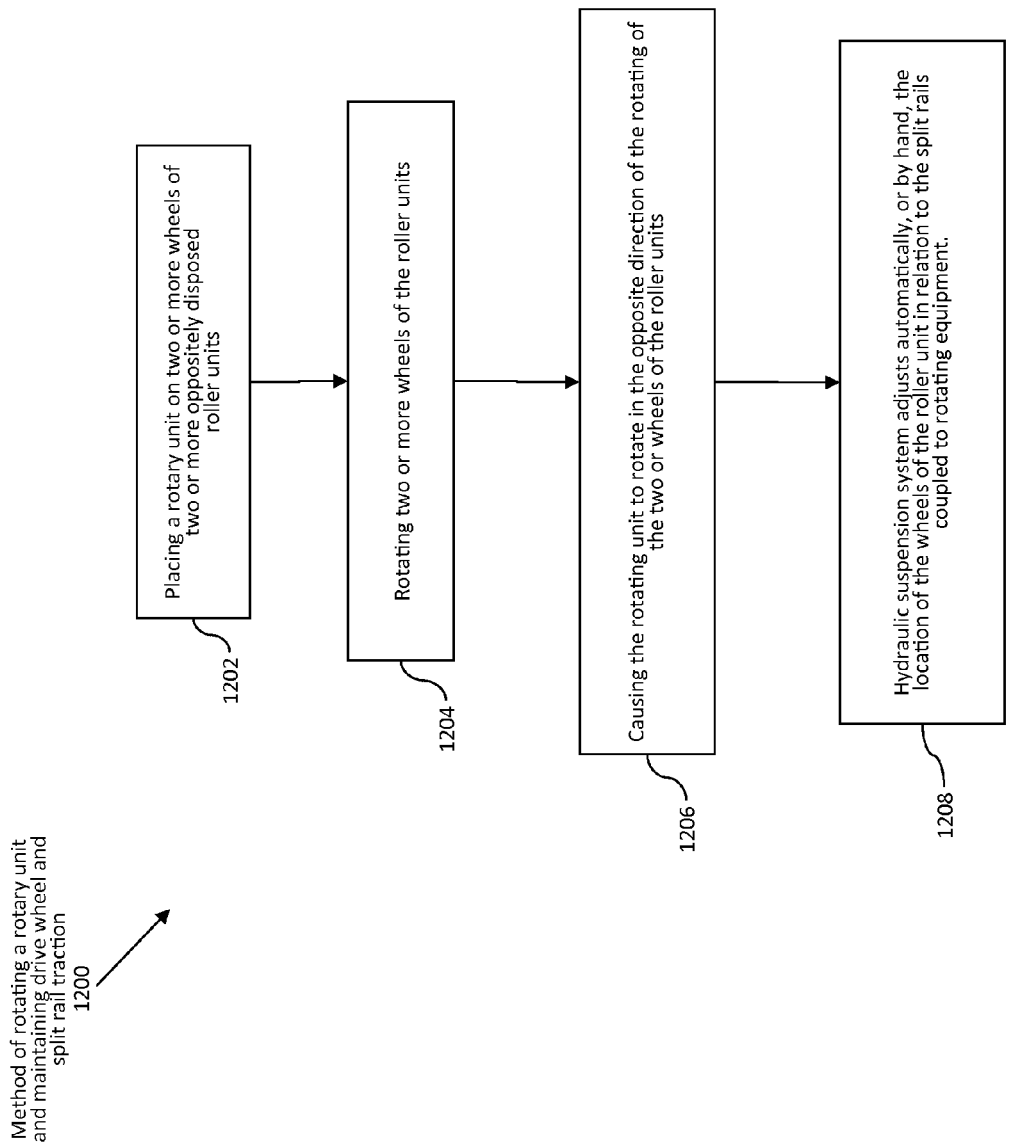
FIG. 12 is a diagram showing a flow chart of a method of rotating a rotary unit and maintaining drive wheel and split rail traction.

FIG. 12 is a flow chart showing a method of rotating a rotating unit and maintaining drive wheel and split rail traction 1200. As shown in FIG. 12, in step 1202 a rotating unit such as a kiln, calciner, dryer, mixer or grinding mill is placed on and supported by two or more wheels of two or more oppositely disposed roller units. In step 1204, the oppositely disposed roller units comprise at least two rimmed wheels operably coupled to an axle assembly, which is driven by a dedicated gear system with a dedicated motor speed and traction controller, a hydraulic suspension and support system, and a position control module. The roller units are supported by a series of bogie support structures, which are operably coupled and supported by a support structure such as a steel truss or W beam and then further supported by a structure such as concrete, pilings or skid foundation. The wheels of the rotating units are turned, and the friction between the wheels and the split rails and as shown in step 1206 causes the rotating unit to turn in the opposite direction of the wheels. In step 1208, an active hydraulic suspension and support system of the roller unit imparts vertical position control (equipment slope) and horizontal alignment by adjusting vertically and skewing the axle of the roller unit, respectively, allowing the system to maintain friction or traction between the wheels and the split rails while also maintaining the speed, horizontal and vertical control of the rotating unit. The active hydraulic suspension and support system adjusts automatically, or by hand, the location of the wheels of the roller unit in relation to the split rails coupled to rotating equipment.

Figure 13:
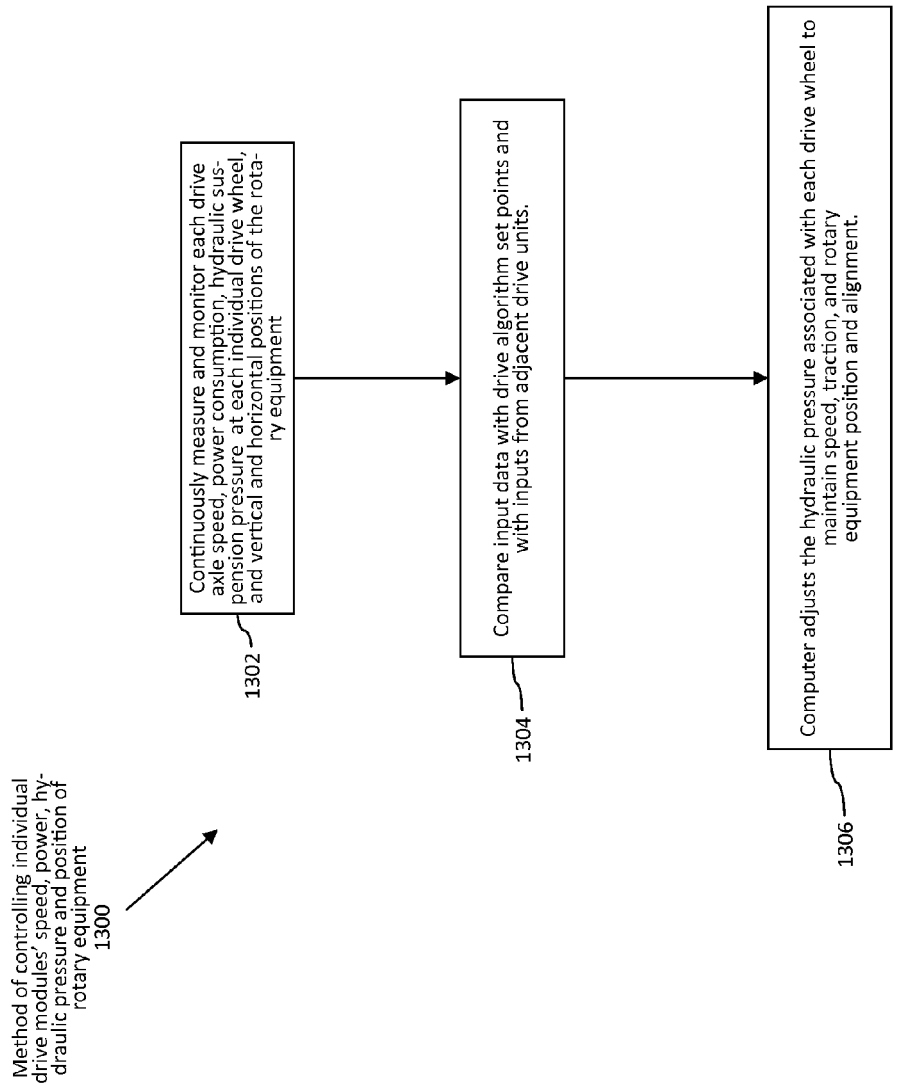
FIG. 13 is a diagram showing a flow chart of a method of controlling individual drive modules speed, power, hydraulic pressure and position of rotary equipment for the system described herein.

FIG. 13 is a flow chart 1300 showing a method of controlling each individual roller unit causing rotation of a rotary unit. As shown in FIG. 13, in step 1302 a roller unit for a rotary unit such as a kiln, calciner, dryer, mixer or grinding mill is provided with sensory instrumentation to monitor the speed, power and fraction of the rotary unit and its drive units, including speed sensors, power consumption sensors, vertical position control sensors, and horizontal position control sensors. One or more of these sensors are used to continuously measure the speed and fraction of each drive axle assembly in relation to the speed of the rotary unit, the power consumption by each roller unit, hydraulic suspension pressure at each individual drive wheel, as well as the rotary equipment vertical and horizontal positions. In step 1304, each sensor monitors specific data related to the rotary unit and then transmits the data to a logic unit where the data is processed. The data may then be compared with pre-determined control algorithms, similar input data from other and adjacent drive units, as well as desired operator control set points. In step 1306, based upon the analysis of the data from the sensors, the logic unit will then send a command to the hydraulic suspension and support system to adjust the hydraulic pressure associated with each drive wheel to achieve optimal speed, traction, and rotary equipment position and alignment.

Figure 14:
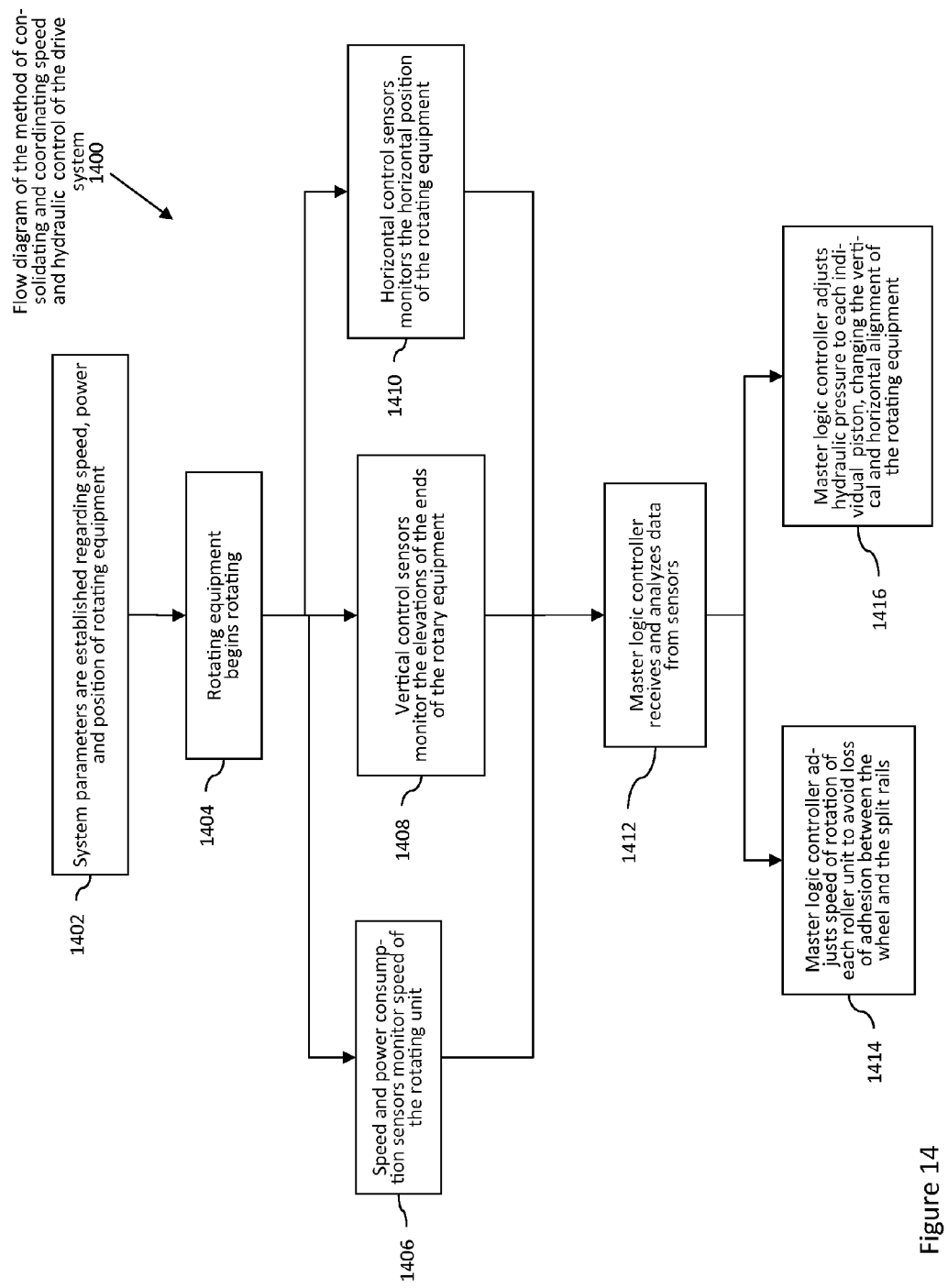
FIG. 14 is a diagram showing a flow chart overview of the method of consolidating and coordinating the speed, traction and position controls of the system described herein.

FIG. 14 shows a flow diagram of the method of using the speed, power, traction and hydraulic controls in relation to the overall drive system 1400. As shown in FIG. 14, in step 1402 an operator or external source provides a set of system parameters regarding speed, power and position of rotary unit. In step 1404, the rotary unit such as a kiln is operated, rotated or turned by means of split rails, which are operably coupled to the rotating equipment and placed on roller units. Wheels housed in the roller units turn the rotating equipment by frictional adherence to the split rails. In step 1406, speed and power consumption sensors monitor the speed and calculate the traction of rotary unit in relation to each roller unit. In step 1408, one or more vertical position control sensors monitor the vertical elevation of the ends of the rotary unit. The vertical position control sensors may also be employed to monitor the shape or out-of-roundness of the rotating equipment. In step 1410, a horizontal position control sensor monitors the horizontal position or alignment of the rotating equipment. In step 1412, the information from the speed and power consumption sensors, vertical position control sensors and horizontal position control sensors is transmitted to a master logic controller where it is analyzed and compared to control algorithms and set points. In step 1414, the motor control and traction control, through a command from the master logic controller, using the motor speed, power, and traction information sends a signal to the roller unit's motor, adjusting the speed of the wheels causing rotation of the rotary equipment in order to increase the traction and reduce slippage between the wheels and the split rails. The master logic controller may also adjust the power consumption of roller drive unit in order to maximize the efficiency of the roller unit. In step 1416, the hydraulic pressure controller, also taking direction from the master logic controller, based on the analysis of the motor speed, power, and traction information transmitted to the master logic controller, adjusts the vertical position and the skew of the axle assembly and the wheels of the roller unit in order to achieve the position set point requirements of the rotary equipment. The master logic controller, in order to skew the axle assembly and the wheels of the roller units, may also receive and use a differential hydraulic pressure signal from the two hydraulic cylinders on each drive axle (not shown in FIG. 14), to adjust the skew of each individual roller unit. As an example, the master logic controller may require a change in the horizontal position of the rotary unit to respond to increased downhill loading caused by a change in process throughput. The master logic controller will respond by sending a signal to the hydraulic pressure controls in step 1416 to add very slight additional pressure to all of the uphill roller unit hydraulic cylinders. This then would slightly change the skew angle of the drive axles of any or all of the roller units with respect to the center longitudinal axis of the rotary equipment, thus mechanically inducing a uphill directional thrust in the horizontal position of the rotating unit.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A support, suspension, drive, traction and position control system for operating rotary equipment comprising:
   a rotating equipment;
   two or more split rail tyres, wherein the two or more split rail tyres encircle the rotating equipment;
   one or more sets of oppositely disposed roller units, wherein each roller unit comprises:
      two wheels;
      a drive axle assembly, wherein the two wheels are operably coupled to the drive axle assembly;
      a roller drive unit operably coupled to the drive axle assembly, wherein the roller drive unit comprises:
         a driven gear;
         a pinion drive gear;
         a gear box; and
         a motor;
      wherein each one or more sets of oppositely disposed roller units is in contact with at least one split rail tyre of the two or more split rail tyres;
   a flat plate support system, wherein said flat plate support system comprises:
      an upper flat plate operably coupled to said hydraulic suspension and support system hydraulic piston; and
      a lower flat plate, wherein said upper flat plate slides on said lower flat plate; and
      a mechanical kingpin, wherein said kingpin mates said upper flat plate to a slot in said lower flat plate and provides guidance to said upper flat plate;
   a hydraulic suspension and support system, wherein said hydraulic suspension and support system is operably coupled to said roller drive unit of said roller unit;
   wherein said roller drive unit is capable of movement both vertically and horizontally in conformance with vertical movements of the hydraulic suspension and horizontal movements of the rotary equipment;
   wherein said hydraulic suspension and support system adjusts the position of said one or more oppositely disposed roller units to provide both vertical position control and drive wheel traction control of said rotating equipment;
   wherein said hydraulic suspension and support system adjusts the position of said one or more oppositely disposed roller units to provide horizontal alignment of said rotating equipment;
   one or more bogie support structures, wherein said bogie support structures are operably coupled to said hydraulic suspension and support system by means of said flat plate support system;
   a truss, wherein said truss supports said one or more bogie support structures;
   a foundation, wherein said foundation supports or replaces said truss; and
   one or more position control modules operably coupled to said roller unit.

2. The system of claim 1, wherein said hydraulic suspension and support system comprises:
   at least one piston housed within a hydraulic cylinder, wherein said hydraulic cylinder is operably coupled to a cylinder base;
   wherein said cylinder base is operably linked to said bogie support structure; and
   wherein said piston is operably coupled to said drive axle assembly.

3. The system of claim 2, wherein said hydraulic suspension and support system is an active hydraulic suspension and support system.

4. The system of claim 1, wherein said wheels are chosen from rimmed wheels and flanged wheels.

5. The system of claim 1, wherein said one or more position control modules is a motor speed and traction controller.

6. The system of claim 5, further comprising a power consumption sensor, wherein said motor speed and traction controller is in communication with said power consumption sensor.

7. The system of claim 5, wherein said motor speed and traction controller is capable of adjusting the speed of the rotation of the wheels.

8. The system of claim 1, wherein said one or more position control modules further comprises a hydraulic pressure controller.

9. The system of claim 8, further comprising a vertical control sensor, wherein said one or more position control modules is in communication with said vertical control sensor.

10. The system of claim 8, further comprising a horizontal control sensor, wherein said one or more position control modules is in communication with said horizontal control sensor.

11. The system of claim 8, further comprising a hand controller, wherein said hand controller is in communication with said hydraulic pressure controller.

12. The system of claim 8, wherein said hydraulic pressure controller is capable of skewing the drive axle assembly against the rotating equipment.

13. The system of claim 1, wherein said one or more oppositely disposed roller units is a fixed anchor roller unit, wherein said fixed anchor roller unit has a complete solid axle with two smaller diameter bearing journal segments on which a sleeve bearing resides that prevent any lateral movement of the fixed anchor roller unit along the axis of the rotary equipment; or
   an expansion roller unit, wherein said expansion roller unit has a complete solid axle with two smaller diameter bearing journal segments which allow lateral movement of said expansion roller unit along the axis of the rotary equipment.

14. The system of claim 1, wherein said oppositely disposed roller units comprise both fixed anchor roller units, wherein each said fixed anchor roller unit has a complete solid axle with two smaller diameter bearing journal segments on which a sleeve bearing resides that prevent any lateral movement of the fixed anchor roller unit along the axis of the rotary equipment; and
   expansion roller units, wherein each said expansion roller unit has a complete solid axle with two smaller diameter bearing journal segments which allow lateral movement of said expansion roller unit along the axis of the rotary equipment.

15. The system of claim 1, wherein said one or more oppositely disposed roller units are positioned at a vector range between 35° and 45° from horizontal and pointed towards the center axis of the rotating equipment.

16. The system of claim 1, wherein said split rail tyres are pointed and have an overlap or a gap for differential expansion.

17. The system of claim 1, wherein said hydraulic suspension and support system is capable of adjusting the slope of the rotating equipment.

18. A method for operating rotating equipment, wherein said method comprises:
provide a mechanical drive and support system for turning rotary equipment wherein said mechanical drive and support system comprises:
coupling one or more split rail tyres to a rotary equipment, wherein the one or more split rail types encircle the rotating equipment;
placing said rotary equipment on one or more oppositely disposed roller units, wherein the roller units comprise:
two wheels;
a drive axle assembly, wherein the two wheels are operably coupled to the drive axle assembly;
a roller drive unit operably coupled to the drive axle assembly, wherein the roller drive unit comprises:
a driven gear;
a pinion drive gear;
a gear box; and
a motor;
providing a flat plate support system, wherein said flat plate support system comprises:
an upper flat plate operably coupled to said hydraulic suspension and support system hydraulic piston; and
a lower flat plate, wherein said upper flat plate slides on said lower flat plate; and
a mechanical kingpin, wherein said kingpin mates said upper flat plate to a slot in said lower flat plate and provides guidance to said upper flat plate;
providing a hydraulic suspension and support system, wherein said hydraulic suspension and support system is operably coupled to said roller drive unit of said one or more roller units and wherein said hydraulic suspension and support system adjusts the position of said one or more roller units to provide vertical position control, horizontal alignment control, and drive wheel traction control of said rotating equipment;
wherein said roller drive unit is capable of movement both vertically and horizontally in conformance with vertical movements of the hydraulic suspension and horizontal movements of the rotary equipment;
wherein said hydraulic suspension and support system adjusts the position of said one or more oppositely disposed roller units to provide both vertical position control and drive wheel traction control of said rotating equipment;
wherein said hydraulic suspension and support system adjusts the position of said one or more oppositely disposed roller units to provide horizontal alignment of said rotating equipment;
providing one or more bogie support structures wherein said bogie support structure supports said hydraulic suspension and support system by means of said flat plate support system;
providing a truss, wherein said truss supports said bogie support structure;
providing a foundation, wherein said foundation supports said truss;
providing one or more position control modules operably coupled to said rotating equipment;
providing a traction measurement system in communication with said one or more position control modules;
monitoring the speed, vertical position and horizontal position of said rotating equipment in relation to said one or more roller unit; and
adjusting the speed, vertical position and horizontal position of said rotating equipment in relation to said one or more roller unit.

19. The method of claim 18, further comprising:
providing a motor speed and traction controller, wherein said motor speed and traction controller controls the speed of rotation of said wheels.

20. The method of claim 19, further comprising at least one speed sensor, wherein said wherein said one or more speed sensors monitor the speed of said rotating equipment in relation to the speed of said wheels, and wherein said motor speed and traction controller is in communication with said one or more speed sensors.

21. The method of claim 20, further comprising adjusting the speed of said wheels based on analysis of the data from said at least one speed sensor.

22. The method of claim 20, further comprising at least one power consumption sensor, wherein said wherein said at least one power consumption sensor monitors the power consumption of said roller drive unit, and wherein said motor speed and traction controller is in communication with said one or more speed sensors.

23. The method of claim 22, further comprising:
analyzing data from said at least one power consumption sensor; and
adjusting the power to said roller drive unit based on analysis of said data from said at least one power consumption sensor.

24. The method of claim 19, wherein said motor speed and traction controller varies the speed of the rotation of the wheels.

25. The method of claim 18, further comprising
providing a hydraulic pressure controller operably coupled to said hydraulic suspension and support system, wherein said hydraulic pressure controller adjusts the vertical position of said roller unit by adjusting the hydraulic pressure to said hydraulic suspension and support system.

26. The method of claim 25, further comprising a hand controller, wherein said hand controller is in communication with said hydraulic pressure controller.

27. The method of claim 25, further comprising a vertical control sensor, wherein said one or more position control modules is in communication with said vertical position control sensor.

28. The method of claim 27, further comprising:
analyzing data from said at least one vertical position control sensor;
adjusting the position of said wheels of said roller unit in relation to said rotating equipment based on analysis of said data from said at least one vertical position control sensors.

29. The method of claim 25, further comprising a horizontal position control sensor, wherein said one or more position control modules is in communication with said horizontal position control sensor.

30. The method of claim 29, further comprising:
analyzing data from said at least one horizontal position control sensor;
adjusting the position of said wheels of said roller unit in relation to said rotating equipment based on analysis of said data from said at least one horizontal position control sensor.

31. The method of claim 25, wherein said hydraulic pressure controllers provide horizontal position control and alignment of the rotating equipment by skewing the axle assembly of the one or more oppositely disposed roller units against the rotating equipment.

32. The method of claim 18, wherein said hydraulic suspension and support adjusts the slope of the rotating equipment by adjusting the position of one or more oppositely disposed roller units.

* * * * *